US012750459B2

(12) United States Patent
Bakunov et al.

(10) Patent No.: US 12,750,459 B2
(45) Date of Patent: Sep. 29, 2026

(54) ASPECT RATIO CONVERSION FOR AUTOMATED IMAGE GENERATION

(71) Applicant: Snap Inc., Santa Monica, CA (US)

(72) Inventors: Mykyta Bakunov, Freienbach (CH); Arnab Ghosh, Oxford (GB); Pavel Savchenkov, London (GB); Sergey Smetanin, London (GB); Jian Ren, Marina del Ray, CA (US)

(73) Assignee: SNAP INC., Santa Monica, CA (US)

(*) Notice: Subject to any disclaimer, the term of this patent is extended or adjusted under 35 U.S.C. 154(b) by 621 days.

(21) Appl. No.: 18/115,997

(22) Filed: Mar. 1, 2023

(65) Prior Publication Data

US 2024/0297957 A1 Sep. 5, 2024

(51) Int. Cl.

| | |
|---|---|
| ***H04N 7/01*** | (2006.01) |
| ***G06T 3/40*** | (2024.01) |
| ***G06T 7/70*** | (2017.01) |
| ***G06T 9/00*** | (2006.01) |
| ***G06V 10/25*** | (2022.01) |

(52) U.S. Cl.

CPC ............. *H04N 7/0122* (2013.01); *G06T 3/40* (2013.01); *G06T 7/70* (2017.01); *G06T 9/00* (2013.01); *G06V 10/25* (2022.01); *G06T 2207/20084* (2013.01); *G06T 2207/20132* (2013.01); *G06V 2201/07* (2022.01)

(58) Field of Classification Search

CPC ........... H04N 7/0122; G06T 7/70; G06T 3/40; G06T 9/00; G06V 10/25; G06V 2201/07

See application file for complete search history.

(56) References Cited

U.S. PATENT DOCUMENTS 7,214,065 B2 5/2007 Fitzsimmons, Jr.
8,867,849 B1 10/2014 Kirkham et al.
(Continued)

FOREIGN PATENT DOCUMENTS

CN 113721764 A * 11/2021 ............. G06F 3/017
CN 115391588 11/2022
(Continued)

OTHER PUBLICATIONS

Cheng et al., LayoutDiffuse: Adapting Foundational Diffusion Models for Layout-to-Image Generation, Feb. 2023, ARXIV Cornell University Library (Year: 2023).*
(Continued)

*Primary Examiner* — Wednel Cadeau
(74) *Attorney, Agent, or Firm* — SCHWEGMAN LUNDBERG & WOESSNER, P.A.

(57) ABSTRACT

Examples disclosed herein describe aspect ratio conversion techniques for automated image generation. An image generation request comprising a prompt is received from a user device. A processor-implemented automated image generator may generate a first image based on the prompt. The first image has a first aspect ratio. According to some examples, a region of interest is determined in the first image, based on a prompt alignment indicator for the region of interest. The first image is then processed to obtain a second image. The processing includes an automatic cropping operation directed at the region of interest. The second image has a second aspect ratio that is different from the first aspect ratio. The second image is caused to be presented on the user device.

19 Claims, 16 Drawing Sheets

(56) References Cited

U.S. PATENT DOCUMENTS

| | | | |
|---|---|---|---|
| 10,496,924 B1 | 12/2019 | Highnam et al. | |
| 11,445,148 B1 | 9/2022 | Øhrn | |
| 11,809,688 B1 | 11/2023 | Parasnis et al. | |
| 11,947,893 B1 | 4/2024 | Seth | |
| 12,169,626 B2 | 12/2024 | Zakharov et al. | |
| 12,205,207 B2 | 1/2025 | Smetanin et al. | |
| 2014/0051402 A1 | 2/2014 | Qureshi | |
| 2014/0344712 A1 | 11/2014 | Okazawa et al. | |
| 2016/0125269 A1 | 5/2016 | Lee et al. | |
| 2016/0188153 A1 | 6/2016 | Lerner et al. | |
| 2019/0295302 A1 | 9/2019 | Fu et al. | |
| 2020/0267182 A1 | 8/2020 | Highnam et al. | |
| 2021/0042796 A1 | 2/2021 | Khoury et al. | |
| 2021/0209184 A1 | 7/2021 | Huang et al. | |
| 2021/0352460 A1 | 11/2021 | Rohde et al. | |
| 2022/0036153 A1 | 2/2022 | O'Malia et al. | |
| 2022/0101578 A1 | 3/2022 | Bedi et al. | |
| 2022/0114698 A1 | 4/2022 | Liu | |
| 2022/0415012 A1* | 12/2022 | Karmakar | G06V 10/443 |
| 2023/0025835 A1 | 1/2023 | Moriya et al. | |
| 2023/0054174 A1 | 2/2023 | Peled et al. | |
| 2023/0081171 A1* | 3/2023 | Zhang | G06T 11/00 382/157 |
| 2023/0177878 A1 | 6/2023 | Sekar et al. | |
| 2023/0215441 A1 | 7/2023 | Wu | |
| 2023/0222703 A1 | 7/2023 | Baheti et al. | |
| 2023/0230198 A1 | 7/2023 | Zhang et al. | |
| 2023/0260164 A1 | 8/2023 | Yuan et al. | |
| 2023/0262102 A1 | 8/2023 | Das et al. | |
| 2023/0281789 A1 | 9/2023 | Sudarsky et al. | |
| 2023/0298224 A1 | 9/2023 | Aggarwal et al. | |
| 2023/0342284 A1 | 10/2023 | Easton et al. | |
| 2024/0135610 A1 | 4/2024 | Kolkin et al. | |
| 2024/0161258 A1 | 5/2024 | Maschmeyer et al. | |
| 2024/0169622 A1 | 5/2024 | Xie et al. | |
| 2024/0193821 A1 | 6/2024 | Denison | |
| 2024/0295953 A1 | 9/2024 | Zakharov et al. | |
| 2024/0296535 A1 | 9/2024 | Bakunov et al. | |
| 2024/0296606 A1 | 9/2024 | Smetanin et al. | |
| 2024/0311960 A1* | 9/2024 | Feng | G06T 3/4046 |
| 2024/0362830 A1 | 10/2024 | Zhang et al. | |
| 2025/0148674 A1 | 5/2025 | Smetanin et al. | |
| 2026/0057503 A1 | 2/2026 | Bakunov et al. | |

FOREIGN PATENT DOCUMENTS

| | | |
|---|---|---|
| EP | 3698258 | 8/2020 |
| WO | 2024182144 | 9/2024 |
| WO | 2024182169 | 9/2024 |
| WO | 2024182240 | 9/2024 |
| WO | 2024182438 | 9/2024 |

OTHER PUBLICATIONS

Cheng et al., Layout Diffuse: Adapting Foundational Diffusion Models for Layout-to-Image Generation, Feb. 2023, Cornell University Library (Year: 2023).*

Li, Junnan, "BLIP: Bootstrapping Language-Image Pre-training for Unified Vision-Language Understanding and Generation", arXiv: 2201.12086v2 [cs.CV], (Feb. 15, 2022), 12 pgs.

Schuhmann, Christoph, "CLIP+MLP Aesthetic Score Predictor", [Online] Retrieved from the Internet: <URL: https://github.com/christophschuhmann/improved-aesthetic-predictor>, (Jun. 30, 2022), 2 pgs.

Vincent, James, "TikTok Now Offers A Very Basic Text-To-Image AI Generator Directly In The App", The Verge, (Aug. 15, 2022), 4 pgs.

"U.S. Appl. No. 18/116,003, Corrected Notice of Allowability mailed Nov. 6, 2024", 2 pgs.

"U.S. Appl. No. 18/176,843, Non Final Office Action mailed Nov. 8, 2024", 16 pgs.

"U.S. Appl. No. 17/844,587, Corrected Notice of Allowability mailed Dec. 16, 2024", 3 pgs.

"U.S. Appl. No. 18/116,003, Notice of Allowance mailed Jul. 26, 2024", 7 pgs.

"U.S. Appl. No. 18/176,971, Notice of Allowance mailed Sep. 17, 2024", 6 pgs.

"U.S. Appl. No. 18/116,003, Non Final Office Action mailed Sep. 26, 2023", 26 pgs.

"U.S. Appl. No. 18/176,971, Non Final Office Action mailed Dec. 19, 2023", 19 pgs.

"Midjourney Banned Words: Understanding the AI image Generator's Restrictions", [Online]. Retrieved from the Internet: <https://midjourney.co.in/midjourney-banned-words-understanding-the-ai-image-generators-restrictions/>, (Feb. 24, 2023), 9 pgs.

"AI Prompt Art Maker Generator", Emoji World, [Online]. Retrieved from the Internet: <https://apps.apple.com/us/app/ai-prompt-art-maker-generator/id6444807049>, (Dec. 6, 2022), 5 pgs.

"U.S. Appl. No. 18/116,003, Response filed Dec. 18, 23 to Non Final Office Action mailed Sep. 26, 2023", 11 pgs.

"U.S. Appl. No. 18/176,971, Response filed Mar. 15, 24 to Non Final Office Action mailed Dec. 19, 2023", 13 pgs.

"U.S. Appl. No. 18/116,003, Final Office Action mailed Mar. 20, 2024", 27 pgs.

"U.S. Appl. No. 18/116,003, Response filed May 15, 2024 to Final Office Action mailed Mar. 20, 2024", 9 pgs.

"International Application Serial No. PCT/US2024/017140, International Search Report mailed May 28, 2024", 4 pgs.

"International Application Serial No. PCT/US2024/017140, Written Opinion mailed May 28, 2024", 5 pgs.

"International Application Serial No. PCT/US2024/016539, International Search Report mailed May 31, 2024", 3 pgs.

"International Application Serial No. PCT/US2024/016539, Written Opinion mailed May 31, 2024", 5 pgs.

"U.S. Appl. No. 18/176,971, Notice of Allowance mailed Jun. 3, 2024", 6 pgs.

"International Application Serial No. PCT/US2024/017545, International Search Report mailed Jun. 7, 2024", 3 pgs.

"International Application Serial No. PCT/US2024/017545, Written Opinion mailed Jun. 7, 2024", 7 pgs.

"Application Serial No. 18 /116,003, Notice of Allowance mailed Jun. 7, 2024", 7 pgs.

"International Application Serial No. PCT/US2024/016223, International Search Report mailed Jun. 18, 2024", 4 pgs.

"International Application Serial No. PCT/US2024/016223, Written Opinion mailed Jun. 18, 2024", 7 pgs.

Chen, Shoufa, "DiffusionDet: Diffusion Model for Object Detection", Arxiv.org, Cornell University Library, 201, Olin Library Cornell University Ithaca, NY 1485, (Nov. 17, 2022), 16 pgs.

Cheng, Jiaxin, "LayoutDiffuse: Adapting Foundational Diffusion Models for Layout-to-Image Generation", Arxiv.org, Cornell University Library, 201 Olin Library Cornell University Ithaca, NY 14853, (Feb. 16, 2023), 15 pgs.

Dinh, Tan M., "Tise: Bag of Metrics for Text—to—Image Synthesis Evaluation", Arxiv.org, Cornell University Library, 201 Olin Library Cornell University Ithaca, NY 14853, (Jul. 19, 2022), 34 pgs.

Gu, Shuyang, "GIQA: Generated Image Quality Assessment", Arxiv.org, Cornell University Library, 201 Olin Library Cornell University Ithaca, NY 14853, (Mar. 19, 2020), 26 pgs.

Hao, Yaru, "Optimizing Prompts for Text-to-Image Generation", Arxiv.org, Cornell University Library, 201 Olin Library Cornell University Ithaca, NY 14853, (Dec. 19, 2022), 16 pgs.

Li, Yuheng, "GLIGEN: Open-Set Grounded Text-to-Image Generation", Arxiv.org, Cornell University Library, 201, Olin Library Cornell University Ithaca, NY, 14853, (Jan. 17, 2023), 21 pgs.

Oppenlaender, Jonas, "A taxonomy of prompt modifiers for text-to-image generation", arXiv preprint arXiv:2204.13988v2., (Jul. 31, 2022), 18 pgs.

Palli, Praneeth, "Want To Change Wallpaper For A Specific Chat On WhatsApp? Follow These Steps", [Online]. Retrieved from the Internet: <https://in.mashable.com/tech/31833/want-to-change-wallpaper-for-a-specific-chat-on-whatsapp-follow-these-steps>, (May 17, 2022), 6 pgs.

Yu, Wenxin, "Blind Image Quality Assessment for a Single Image From Text to Image Synthesis", IEEE Access, IEEE, USA, vol. 9, (Jul. 1, 2021), 12 pgs.

(56) References Cited

OTHER PUBLICATIONS

"U.S. Appl. No. 18/176,843, Examiner Interview Summary mailed Jan. 28, 2025", 2 pgs.
"U.S. Appl. No. 18/176,843, Notice of Allowance mailed Aug. 1, 2025", 6 pgs.
"U.S. Appl. No. 18/176,843, Response filed Feb. 7, 2025 to Non Final Office Action mailed Nov. 8, 2024", 14 pgs.
"CompVis / stable-diffusion", [Online]. Retrieved from the Internet: <URL: https://web.archive.org/web/20230228034148/https://github.com/CompVis/stable-diffusion>, (Archived on Feb. 28, 2023), 8 pgs.
"International Application Serial No. PCT/US2024/016223, International Preliminary Report on Patentability mailed Sep. 11, 2025", 9 pgs.
"International Application Serial No. PCT/US2024/016539, International Preliminary Report on Patentability mailed Sep. 11, 2025", 7 pgs.
"International Application Serial No. PCT/US2024/017140, International Preliminary Report on Patentability mailed Sep. 11, 2025", 7 pgs.
"International Application Serial No. PCT/US2024/017545, International Preliminary Report on Patentability mailed Sep. 11, 2025", 9 pgs.
"salesforce / BLIP", [Online]. Retrieved from the Internet: <URL: https://web.archive.org/web/20230227172725/https://github.com/salesforce/BLIP>, (Archived on Feb. 27, 2023), 6 pgs.
"ultralytics / yolov5", [Online]. Retrieved from the Internet: <URL: https://web.archive.org/web/20230226045622/https://github.com/ultralytics/yolov5>, (Archived on Feb. 26, 2023), 5 pgs.
Schuhmann, Christoph, "Laion-Aesthetics", [Online]. Retrieved from the Internet: <URL: https://laion.ai/blog/laion-aesthetics/>, (Aug. 16, 2022), 4 pgs.

* cited by examiner

1102

1106 1108 1104

| AUTO-COLLECTED QUERY | AUTO-GENERATED QUERY | IMAGE |
|---|---|---|
| GORGEOUS SKULLFACE MAKEUP | A MAN WITH HIS FACE PAINTED IN BLACK AND WHITE |  |
| STAR RICE KRISPIE TREAT DECORATED WITH RED WHITE AND BLUE STAR SPRINKLES | A HAND HOLDING A COOKIE WITH RED, WHITE AND BLUE STARS ON IT | 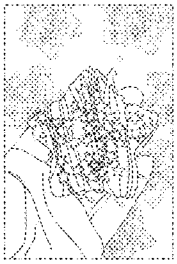 |
| IMAGE RESULT FOR CRACKERS BABY | A BABY SHOWER PARTY | 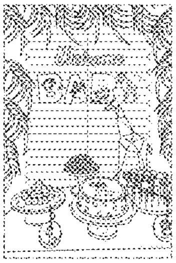 |
| BRIDAL STYLE 4021 OFF THE SHOULDER BALL GOWN | A WOMAN IN A WEDDING DRESS | 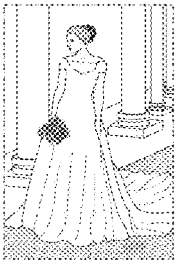 |

FIG. 11

ASPECT RATIO CONVERSION FOR AUTOMATED IMAGE GENERATION

TECHNICAL FIELD

The subject matter disclosed herein generally relates to automated image generation. Specific examples relate to aspect ratio conversion in automated image generation systems and to fine-tuning of machine learning models based on image aspect ratios.

BACKGROUND

The field of automated image generation, including artificial intelligence (AI) driven image generation, continues to grow. Machine learning models known as text-to-image models can be trained to analyze natural language descriptions (referred to herein as "prompts") and automatically generate corresponding visual outputs. This process can be referred to as automatic, text-guided image generation.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 11 is a table illustrating four data points in a training data set used in a generative model fine-tuning method, according to some examples.

DETAILED DESCRIPTION

Figure 1:
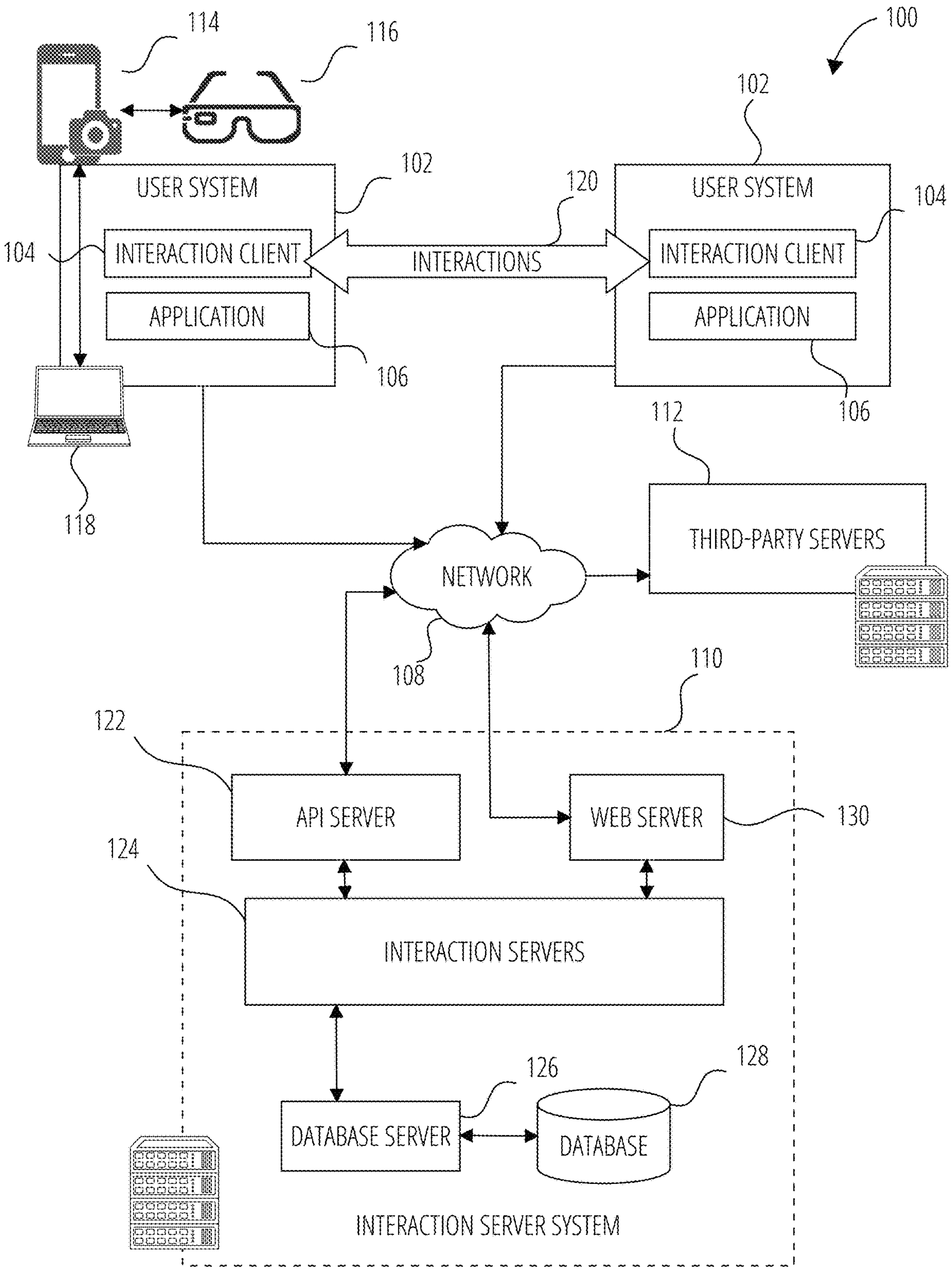
FIG. 1 is a diagrammatic representation of a networked environment in which the present disclosure may be deployed, according to some examples.

Examples of the present disclosure allow for automatic image generation in a specified image format. Methodologies and systems enabling automatic conversion of image aspect ratios, as well as machine learning model optimization techniques for specified image aspect ratios, are described.

Automated image generators utilizing text-to-image technology, e.g., generators built on diffusion models or Generative Adversarial Networks (GANs), may be able to generate high-fidelity images in response to a user's prompts. A number of metrics can be used to evaluate the quality of an image generated by an automated image generator. It may be desirable not only for the image to be of satisfactory visual (aesthetic) quality, but also to achieve a high level of alignment between the image and the original prompt. Visual realism may be one aspect of image quality. For example, an AI-generated image including artifacts, duplicated objects, or important items that appear to be "cut off" at image borders, may be regarded as lacking visual realism.

Providing high-quality images with a desired aspect ratio (the proportional relationship between height and width) may present technical hurdles. For example, during a training phase, a diffusion model may be trained on predominantly, or exclusively, square images. During an inference phase, the trained model may perform well when used to generate square images, but be unable to generate images of satisfactory quality on a consistent basis when dealing with other aspect ratios. For example, when such a model is used to generate "vertical" images with a 3:2 (height:width) aspect ratio, the visual realism of generated images may be unsatisfactory.

The term "vertical image," as used in this disclosure, refers to an image with an aspect ratio where the height is greater than the width. A vertical image may also be referred to as a portrait-oriented image. The term "horizontal image," as used in this disclosure, refers to an image with an aspect ratio where the width is greater than the height. A horizontal image may also be referred to as a landscape-oriented image. The term "square image," as used in this disclosure, refers to an image with a 1:1 aspect ratio (width and height are equal).

In some examples, a machine learning-based approach is utilized to provide improved vertical image generation. A machine learning model trained to generate square images may be utilized to generate a first, square image, which is automatically analyzed and converted to a second, vertical image. The parts of the first image predicted to be the most important, interesting, or relevant, may be automatically detected, and an automatic smart cropping process can be carried out to obtain the second image.

In some examples, a pre-trained machine learning model is fine-tuned to shift the focus of the model from a first aspect ratio to a second aspect ratio, e.g., from square image generation to vertical image generation. A fine-tuning process may involve generating a fine-tuning training data set and supplementing the training data set with additional image captions that were automatically generated by an image-to-text machine learning model.

Techniques described in examples of the present disclosure may be useful in various applications, e.g., in automatic generation of unique profile images or user backgrounds in an interaction application. While certain examples described relate to square-to-vertical aspect ratio adjustments or fine-tuning, it will be appreciated that techniques described herein may be applied to different aspect ratio conversions, transformations, or optimizations, e.g., square-to-horizontal, vertical-to-square, or horizontal-to-vertical conversions.

A technical problem of improving the quality of images generated by an automated image generator can be improved by utilizing one or more of the methodologies described herein, particularly, but not exclusively, in cases where a conversion or transition from one aspect ratio to another is required. In some examples, quality is improved by reducing the occurrence of irrelevant or duplicated content in automatically generated images, or by reducing the occurrence of objects in images appearing as "cut off" at image boundaries. Further, by enabling selective aspect ratio adjustment, examples described herein may provide a more flexible and efficient computing resource to users, reducing manual steps or user input in the process.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 (as an example of an interaction application) and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, image content, prompts, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Programming Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

The interaction servers 124 host multiple systems and subsystems, described below with reference to FIG. 2.

System Architecture

Figure 2:
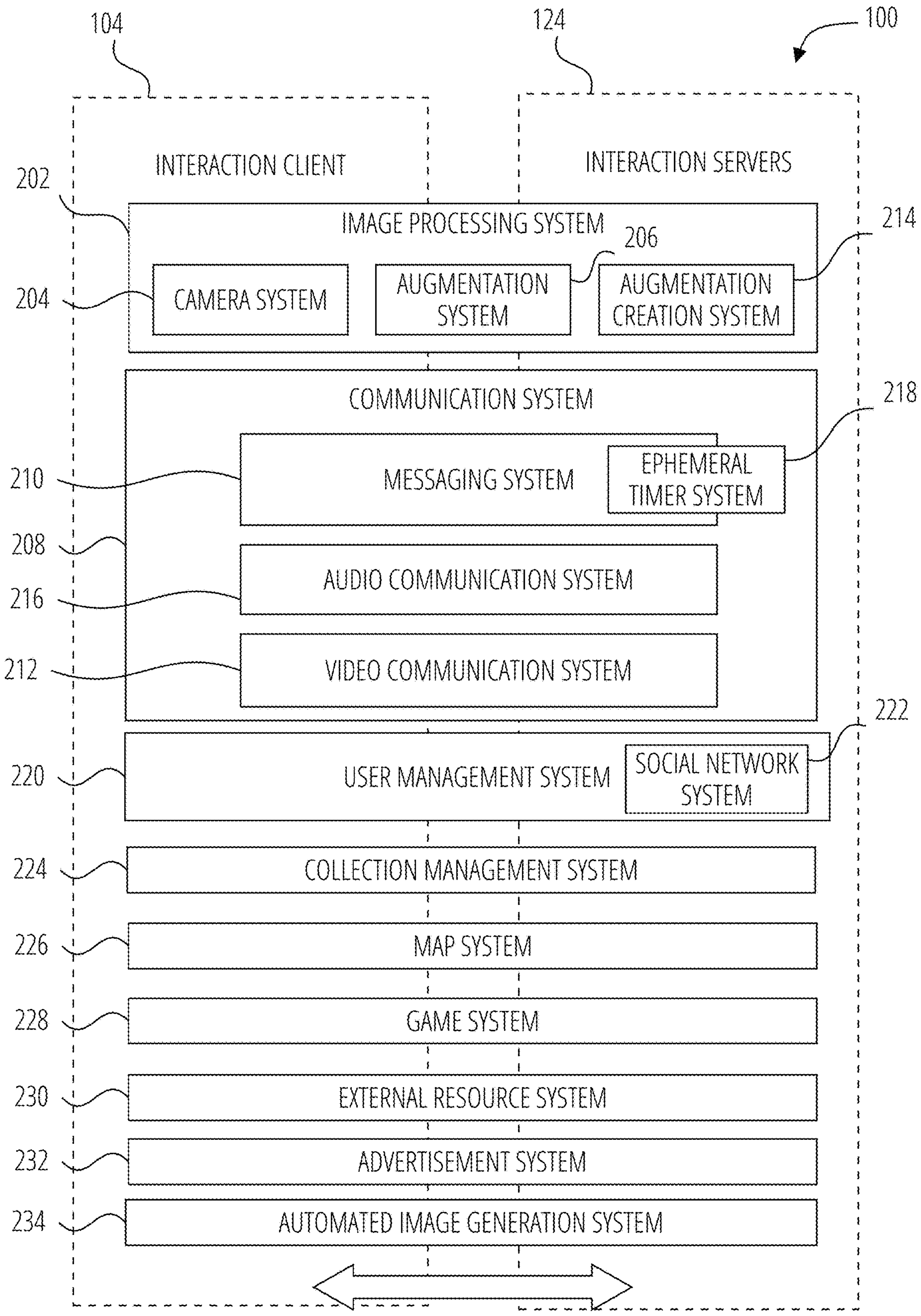
FIG. 2 is a diagrammatic representation of an interaction system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message. A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1402 of a user system 102. These augmentations are selected by the augmentation system 206 and presented to a user of an interaction client 104, based on a number of inputs and data, such as for example:

Geolocation of the user system 102; and

Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126. In some examples, media overlays may be generated or modified using the automated image generation system 234 described below.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes a social network system 222 that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A Web ViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

An automated image generation system 234 enables a user to submit a prompt via the interaction client 104. In response, the automated image generation system 234 causes generation of an image corresponding to the prompt. This can be referred to as a text-guided, automatic image-generation feature. Image generation may be performed using various AI image generation techniques. For example, the automated image generation system 234 may include a processor-implemented automated image generator providing a text-to-image machine learning model, or be communicatively coupled to a third-party automated image generator.

In some examples, the automated image generation system 234 is responsible for converting images generated by an automated image generator from a first aspect ratio to a second aspect ratio, e.g., processing a square image generated by the automated text generator to obtain a vertical image to provide to a user via the mobile device 114. Components of the automated image generation system 234 are, in some examples, used for automated image analysis, processing operations (such as cropping or padding), image and text encoding or decoding, training, or fine-tuning of machine learning models used in automated image generation.

Data Architecture

Figure 3:
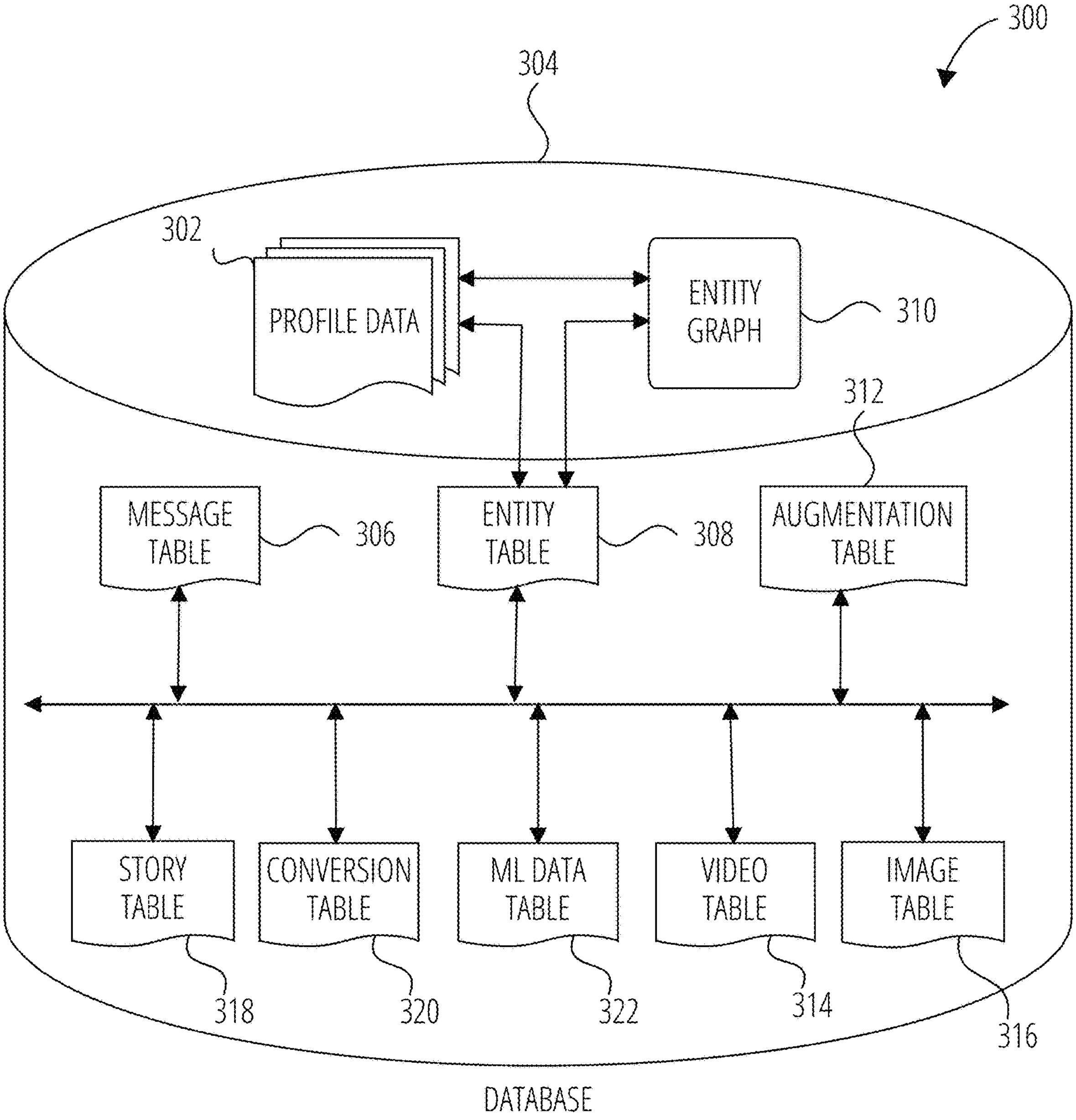
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 13.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a “friend” relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). The profile data 302 may also include profile images, user background images, or the like. One or more of these images may be generated using the automated image generation system 234 described below. A particular user may selectively include one or more of these images or avatar representations within the content of messages communicated via the interaction system 100, and on map interfaces displayed by interaction clients 104 to other users. A collection of avatar representations may include “status avatars,” which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314. The image table 316 may further store image data, e.g., images generated by an automated image generator or images converted to a desired aspect ratio, as described further below.

The conversion table 320 stores data relating to conversion of images from one aspect ratio to another aspect ratio. The data may include adjustment settings, e.g., settings for adjusting images from a square to a vertical orientation in response to a user request for an AI-generated image. The data may include instructions or algorithms for determining regions of interest in images, as well as historic region of interest data for analyzed images. The data may further include processing data such as cropping or padding data for images.

The machine learning data table 322 stores data relating to several machine learning models. The data relating to a machine learning model can include training data, e.g., training data sets or fine-tuning data sets. The data may further include test data, model parameters, evaluation metrics, hyperparameters, feature and target data and metadata, data preprocessing settings, model architecture data, or version history data. Example machine learning models are described below.

Figure 4:
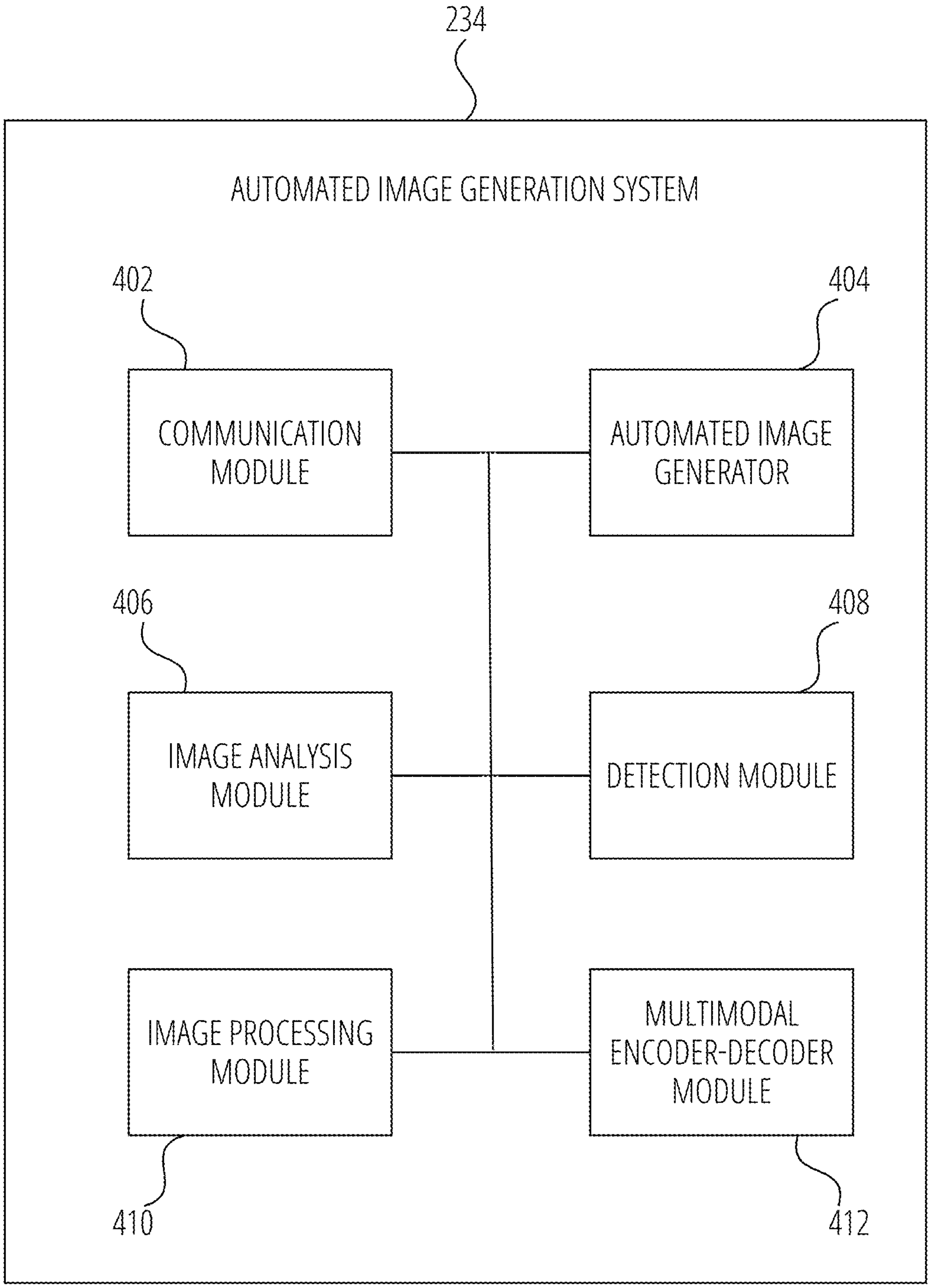
FIG. 4 is a block diagram illustrating components of an automated image generation system, according to some examples.

FIG. 4 is a block diagram illustrating components of the automated image generation system 234, according to some examples. Any one or more of the modules (which may also be referred to as components) described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various examples, modules described herein as being implemented within a single machine, database, or device may be distributed across multiple machines, databases, or devices.

While the automated image generation system 234 is shown in examples as being part of an interaction system, such as the interaction system 100, in other examples, the automated image generation system 234 can form part of other systems, such as content generation systems, content editing systems, or AI services, that may not necessarily provide user interaction features as described with reference to the interaction system 100.

Turning now specifically to FIG. 4, the automated image generation system 234 includes a communication module 402, an automated image generator 404, an image analysis module 406, a detection module 408, an image processing module 410, and a multimodal encoder-decoder module 412.

Figure 5:
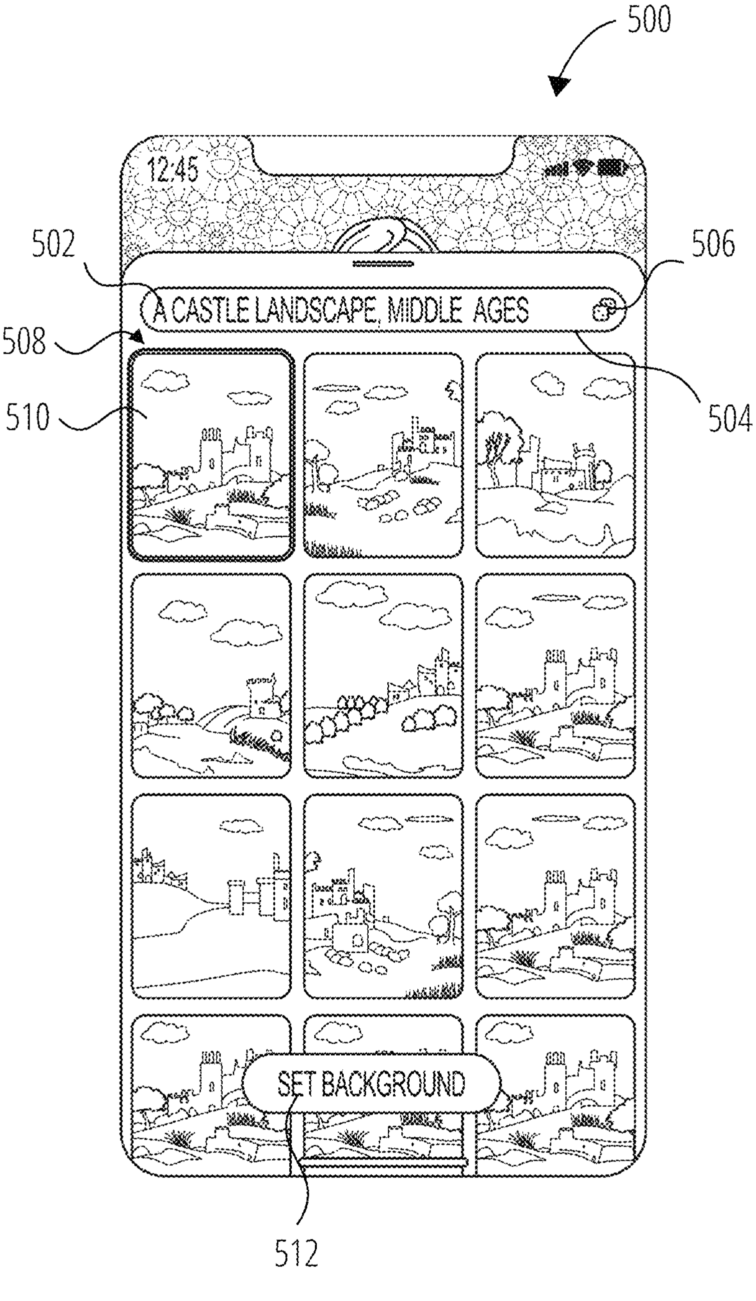
FIG. 5 is a user interface diagram illustrating an image generation and selection user interface, according to some examples.

The communication module 402 is responsible for enabling the automated image generation system 234 to access data, such as prompts and other input provided by a user, and to transmit data, such as output images to be provided to the user. The communication module 402 may receive a prompt originating from a user. FIG. 5 is a user interface diagram illustrating an image generation and selection user interface 500, according to some examples. The image generation and selection user interface 500 allows the user to enter or select a prompt 502 and, in response, receive a vertical background image that is automatically generated by an AI image generator, in order to update the user's profile background within the interaction system 100. A user, e.g., a user accessing the interaction client 104 on the mobile device 114, can enter the prompt 502 in an input text box 504, or select a user-selectable dice element 506. Selection of the dice element 506 by the user causes generation of a random suggested prompt by the interaction system 100. In some examples, the user is restricted to providing no more than a maximum number of characters, e.g., 150 characters, 250 characters, or 400 characters, in the prompt. In FIG. 5, it is shown (merely as an example) that the user enters or selects the following prompt 502: "A castle landscape, Middle Ages."

The automated image generation system 234 may be configured to prohibit the user from generating sensitive or unwanted content. Accordingly, a prompt containing sensitive or unwanted text may be rejected and/or modified prior to image generation.

Returning to FIG. 4, in some examples, certain processes are performed by external components (external to the interaction system 100), and the communication module 402 may communicate with these external components. For example, one or more of image generation, image analysis or object detection functions may be provided by a third-party or other external component or service, and the communication module 402 may facilitate communications to and from such external component or service. The communication module 402 may also communicate with the database 128 of the interaction system 100, e.g., to cause storage or retrieval of data relevant to the automated image generation system 234.

The automated image generator 404 comprises a text-to-image machine learning model in the example form of a diffusion model. A diffusion model is a type of generative machine learning model that can be used to generate images from a given text prompt. It is based on the concept of "diffusing" noise throughout an image to transform it gradually into a new image. A diffusion model may use a sequence of invertible transformations to transform a random noise image into a final image. During training, a diffusion model may learn sequences of transformations that can best transform random noise images into desired output images. A diffusion model can be fed with input data (e.g., a text describing the desired images and the corresponding output images), and the parameters of the model are adjusted iteratively to improve its ability to generate accurate or good quality images.

Once trained, in order to generate an image, the diffusion model uses a text prompt as input and applies the trained sequence of transformations to generate an output image. The model generates the image in a step-by-step manner, updating the image sequentially with additional information until the image is fully generated. This process may be repeated to produce a set of candidate images, from which the final image is chosen based on criteria such as a likelihood score. The resulting image is intended to represent a visual interpretation of the text prompt.

While the automated image generator 404 described herein utilizes a diffusion model to generate images, other types of models may be employed to generate images in other examples, such as GANs, Variational Autoencoders (VAEs), autoregressive models, or other neural networks.

The image analysis module 406 is configured to determine one or more regions of interest in an image generated by the automated image generator 404. The detection module 408 may be responsible for detecting, or obtaining automatic detections of, candidate regions of interest in an image. For example, the detection module 408 may be provided by an object detection system including a deep convolutional neural network trained to perform object detection. The image analysis module 406 may analyze objects or regions detected by the detection module 408 (as well as metadata) and identify one or more regions of interest in the image.

In some examples, a region of interest is selected based on a value associated with a prompt alignment indicator. For example, a region of interest can be encoded into an embedding that is compared to an embedding of the user's text prompt to obtain, for that specific region of interest, a prompt alignment indicator in the example form of an alignment score. The image analysis module 406 may select the region, or regions, with the best alignment scores as the regions of interest in the image.

As used in this disclosure, the term "score" refers to any suitable score or rating, e.g., a numerical score, a percentage-based score, or a grading. A score may also be provided in the form of a classification (e.g., "high level of alignment" or "medium level of alignment") or a range (e.g., 60%-75%). Scores may be generated using continuous (interval) scales, binary scales, or combinations thereof. Accordingly, it will be appreciated that numerous types of scores, grades, classifications, or the like may be employed.

Still referring to FIG. 4, the image processing module 410 is configured to process an image by cropping a selected cropping region from the image, based on the region(s) of interest identified by the image analysis module 406. In some examples, the original image generated by the automated image generator 404 has a first aspect ratio and the image processing module 410 is configured to crop, from the original image, an adjusted image that has a second aspect ratio.

The automated image generation system 234 may perform encoding and decoding operations on various images and/or text objects. In some examples, the automated image generation system 234 includes a multimodal encoder-decoder module 412. The multimodal encoder-decoder module 412 is described further below with reference to FIG. 7.

Once an adjusted image has been generated, the adjusted image may be presented to the user in response to the original prompt (via the communication module 402 and the interaction client 104, for example). In response to receiving the prompt 502, the automated image generation system 234 causes generation of at least one image corresponding to this prompt 502 (e.g., using a diffusion model as explained above). In FIG. 5, it is shown that the automated image generator 404 is used to generate multiple variations, or options, based on the same prompt 502, and these are presented to the user in the image generation and selection user interface 500 as AI-generated images 508. The user can use the image generation and selection user interface 500 to select one of these images as a profile background (or submit a new prompt to option alternative options).

As an example, in FIG. 5, it is shown that the user selects the image 510 and then selects the set background button 512 in order to cause the image 510 to be stored as the profile background. The user's profile data 302 is updated within the interaction system 100 to include the image 510 as a profile background.

Figure 6:
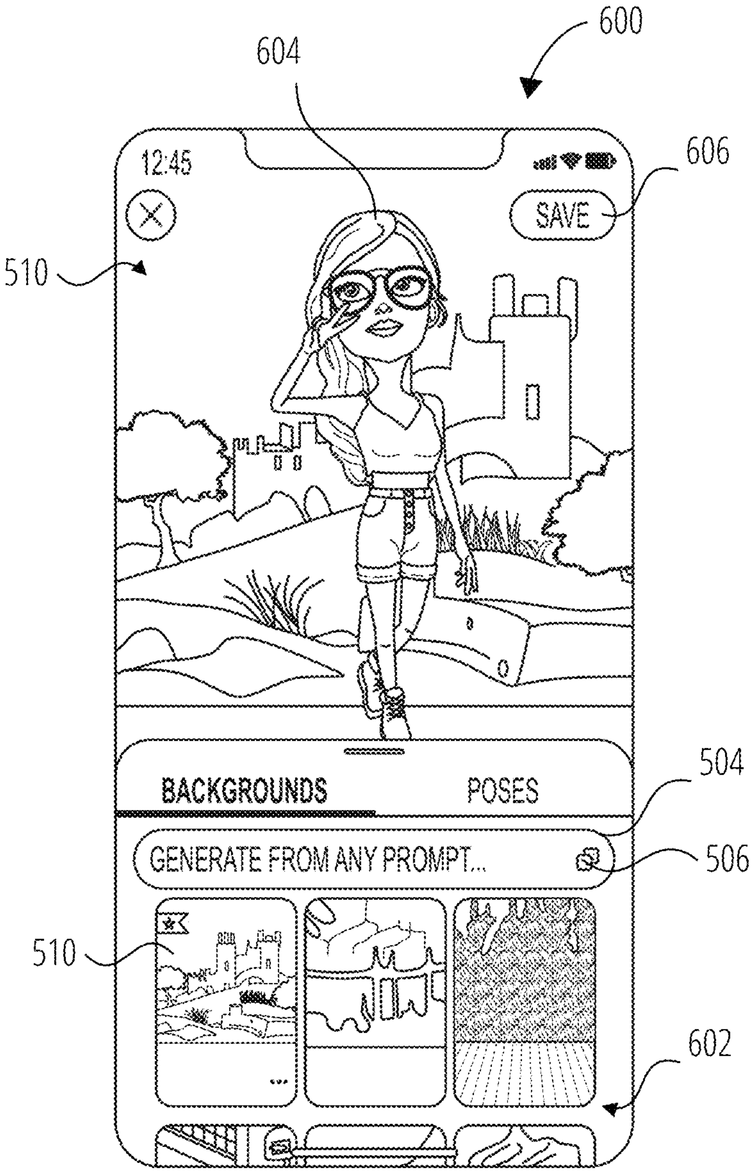
FIG. 6 is a user interface diagram illustrating a profile images user interface, according to some examples.

FIG. 6 shows a profile images user interface 600, according to some examples. The profile images user interface 600 may be presented to the user in response to user selection of the set background button 512. From the profile images user interface 600, the user may save the image 510 by selecting the save button 606, choose to change the profile background by selecting a different background from a set of background options 602, or generate a new background using the AI-tool via the input text box 504 or dice element 506.

The use of the automated image generation system 234 to generate vertical background images is merely one example use case. In some examples, the user is enabled to use the automated image generation system 234 to generate other types of images as well, e.g., an updated image to select as the user's avatar 604 within the interaction system 100.

Figure 7:
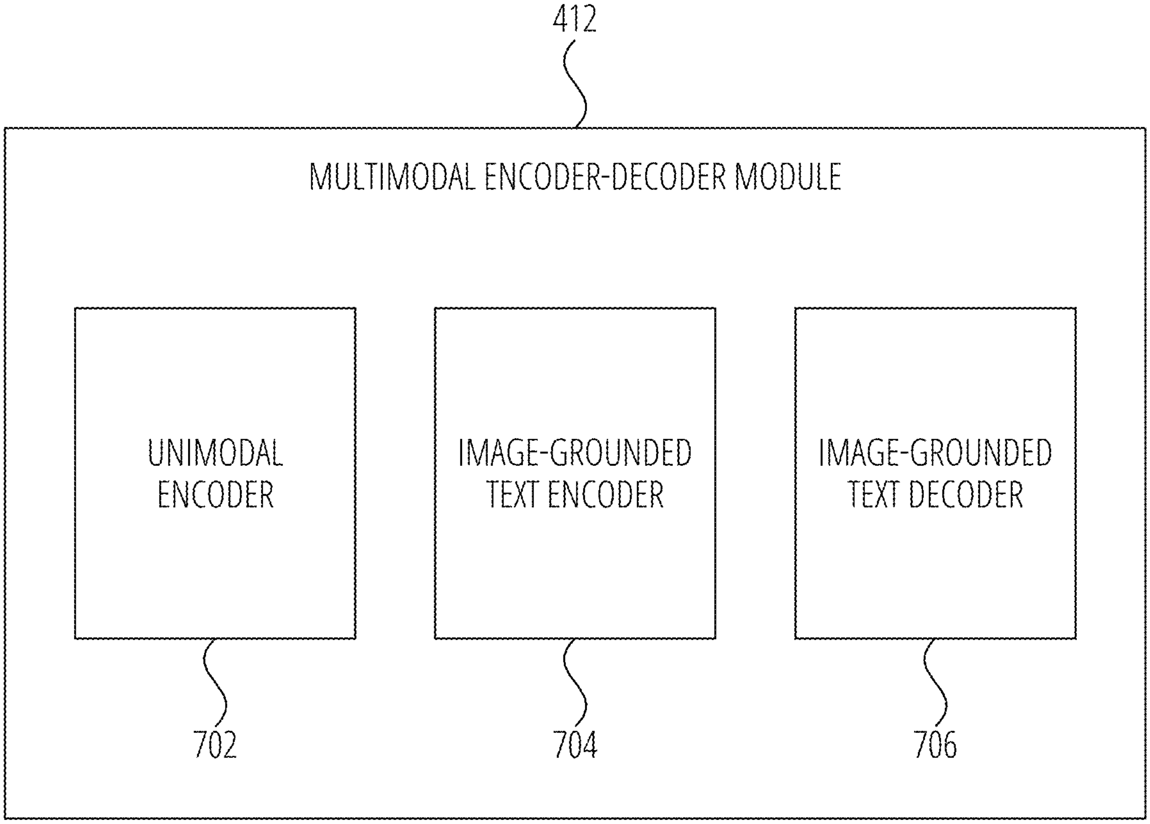
FIG. 7 is a block diagram illustrating functional components of a multimodal encoder-decoder module, according to some examples.

FIG. 7 is a block diagram illustrating components of the multimodal encoder-decoder module 412 of FIG. 4, according to some examples. The multimodal encoder-decoder module 412 is based on a BLIP (Bootstrapping Language-Image Processing) model architecture and comprises the following functional components: a unimodal encoder 702, an image-grounded text encoder 704, and an image-grounded text decoder 706. Any one or more of the modules (which may also be referred to as components) described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various examples, modules described herein as being implemented within a single machine, database, or device may be distributed across multiple machines, databases, or devices.

The multimodal encoder-decoder module 412 provides a unified model for vision-language understanding and generation. The multimodal encoder-decoder module 412 can operate in one of three functionalities using its different functional components, each of which will be described below.

The unimodal encoder 702 is configured to encode images and text separately. The unimodal encoder 702 may comprise a vision transformer as an image encoder, and a text encoder such as a transformer encoder (e.g., based on a BERT, or Bidirectional Encoder Representations from Transformers, architecture). The unimodal encoder 702 is trained using Image-Text Contrastive Loss. In contrast to negative image-text pairs, it seeks to align the feature space of the visual and text transformers by encouraging positive image-text pairs to have similar representations. In use, the unimodal encoder 702 can be used to take input data of a single modality (text or image data) and encode it into a lower-dimensional representation. For text, the input data may be a sequence of words or characters, and the encoder transforms this sequence into a lower-dimensional vector that captures the meaning of the text. For images, the input data may be a set of pixel values, and the encoder transforms this into a lower-dimensional vector that captures the visual features of the image. The resulting encoded vectors can be combined to perform tasks that require both text and image information, such as image captioning or visual question answering.

The image-grounded text encoder 704 is a neural network architecture designed to encode natural language text that is grounded in the context of an image. The image-grounded text encoder 704 may comprise an image encoder and a text encoder. The two feature vectors generated by the encoders, respectively, can be combined to generate a joint representation of the text and image context. The image-grounded text encoder 704 may have a cross-attention layer inserted between a self-attention layer and a feed-forward network for each transformer block of the text encoder to inject visual information. It is trained using Image-Text Matching Loss to distinguish between positive and negative image-text pairs.

The image-grounded text decoder 706 is a type of neural network architecture that is designed to generate natural language descriptions of images. The image-grounded text decoder 706 may comprise an image encoder and a text decoder. The image encoder takes in raw pixel values of the input image and generates a lower-dimensional representation of the image that captures its visual features. The text decoder then takes this image representation as input and generates a sequence of words that describe the image in natural language. It uses causal self-attention layers instead of bi-directional self-attention layers in the text encoder. The decoder is trained using Language Modeling Loss.

For effective training or pre-training, the components described above may share certain parameters and layers to improve training efficiency while benefiting from multi-task learning. A pre-trained model provided by the multimodal encoder-decoder module 412 may, for example, be trained with noisy data, and a filter and "captioner" (a processor-implemented automated caption generator) may be fine-tuned.

One or more of the functionalities of the multimodal encoder-decoder module 412 may be used to implement methodologies described herein, such as image encoding, text encoding, and caption generation. However, the multimodal encoder-decoder module 412, as described, is merely an example, and other types of encoders, decoders, text generators, caption predictors, and the like, whether separated or incorporated into a single system, may be used in some examples.

Examples described herein provide a cropping system configured to crop, from an AI-generated image with a first aspect ratio, the most interesting, informative, or relevant zone, as a converted image with a second aspect ratio. This technique may solve technical problems associated with, for example, hard-coded central cropping techniques, where important parts of an original image may be lost or items relevant to a user's prompt may be cut off.

Figure 8:
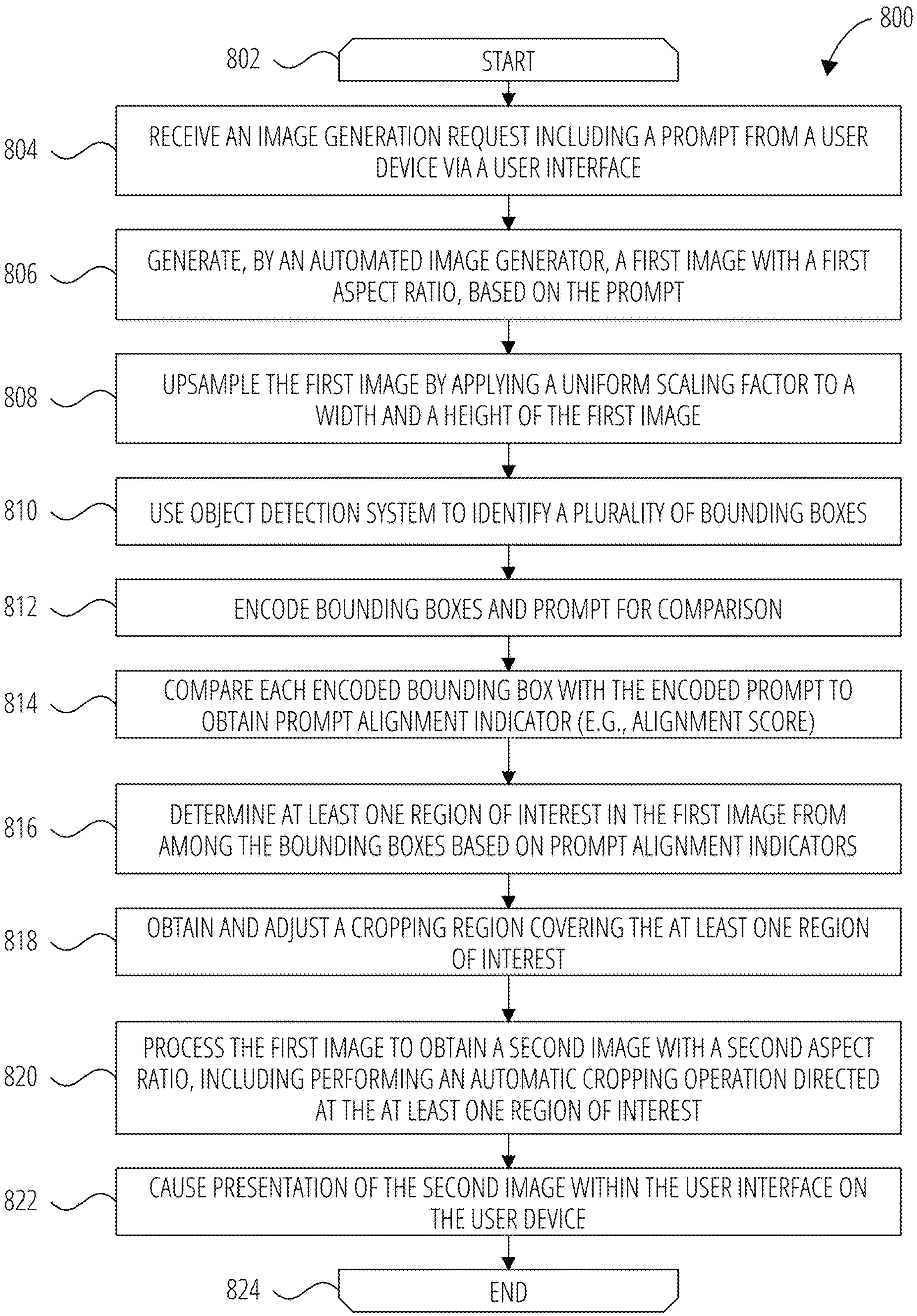
FIG. 8 is a flow diagram illustrating an image generation and processing method, including aspect ratio conversion, performed by an automated image generation system, according to some examples.

FIG. 8 is a flow diagram illustrating an image generation and processing method 800, including aspect ratio conversion, performed by an automated image generation system, according to some examples. The method 800 may be performed by components of the interaction system 100, including the automated image generation system 234.

The method 800 commences at opening loop block 802 and proceeds to block 804, where an image generation request is received. The automated image generation system 234 may receive an image generation request, via the communication module 402. The request includes a prompt, e.g., a sentence describing what the user wants to see in the image. For example, and referring to FIG. 9, the user's prompt may be: "An astronaut riding a horse in a photorealistic style."

Referring again to FIG. 8, in response to receiving the prompt, the automated image generator 404 generates a first image with a first aspect ratio (at block 806). As described above, the automated image generator 404 may include a text-to-image machine learning model in the example form of a diffusion model, trained to generate images based on text prompts. In the method 800 of FIG. 8, the automated image generator 404 has been trained to generate square images using a training data set with a large number of square images and corresponding text descriptions. Accordingly, the automated image generator 404 uses the prompt to generate a square image. The square image is referred to interchangeably as the "first image" and the "square image" with reference to FIG. 8.

It may be desirable, instead of providing the square image directly to the user, to process the square image into an image with a different aspect ratio, e.g., a vertical image, and then provide that "second image" to the user. A vertical image is used as an example of such a second image with reference to FIG. 8.

The method 800 proceeds to block 808, where the first image is upsampled (e.g., using the image processing module 410) by applying a uniform scaling factor to a width and a height of the first image at block 808. For example, the first image may be generated in a 512×512 resolution and scaled to 2048×2048, retaining its square format while facilitating downstream detection of objects and/or regions within the first image. Accordingly, the resolution of the originally generated image may be increased, if necessary, to make it easier to detect objects and/or regions therein automatically (as described further below).

After upsampling the first image, the object detection system of the detection module 408 is used to automatically identify a plurality of bounding boxes in the first image (at block 810). The bounding boxes as examples of candidate regions of interest, or possible regions of interest, within an image. In some examples, the bounding boxes are determined using a suitable object detection machine learning model, such as a deep convolutional neural network trained to detect objects in images. For example, the neural network may analyze the image and produce one or more bounding boxes, with each bounding box identifying an object (or multiple objects) together with class probabilities. Examples of detection techniques include the YOLO (You Only Look Once) approach that is used to make predictions of bounding boxes and class probabilities simultaneously, or the Faster R-CNN (Region-based Convolutional Neural Network) neural network that detects possible regions of interest using a Region Proposal Network and then performs recognition on those regions separately (also outputting bounding boxes and their class probabilities).

Figure 9:
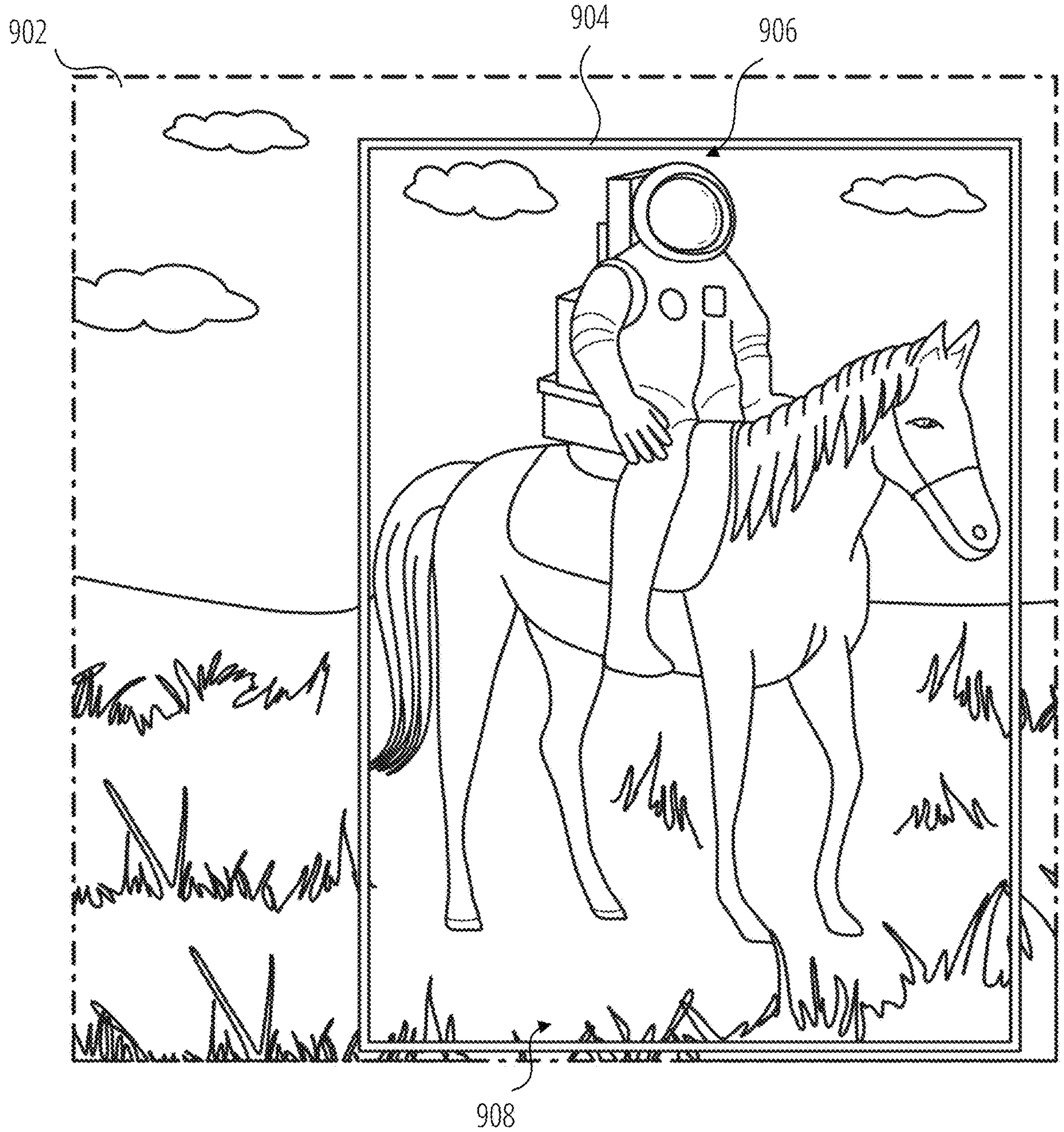
FIG. 9 illustrates a square image and a vertical cropping region within the square image, as determined during the image generation and processing method of FIG. 8, according to some examples.

Using YOLO as an example, when applied to the square image 902 in FIG. 9, the object detection system may output three bounding boxes: one for the horse, one for the astronaut, and one for the horse and the astronaut together. Each bounding box may be output with a class probability and other metadata. In this example, three candidate regions of interest are detected. However, in other examples, this may differ, e.g., 5 or 20 candidate regions of interest. In some examples, the object detection system may be specifically trained or configured to focus on certain types of objects, such as objects in the foreground (ignoring objects in the background).

Then, at block 812, the automated image generation system 234 encodes the bounding boxes and the prompt for comparison. In some examples, an image encoder of the multimodal encoder-decoder module 412 encodes each candidate region of interest to obtain an embedding of the candidate region of interest (capturing a predicted meaning of that region), and a text encoder of the multimodal encoder-decoder module 412 encodes the prompt to obtain an embedding of the prompt (capturing a predicted meaning of the text, e.g., as a vector with a fixed length of 768). Each encoded candidate region of interest is then compared to the encoded text to obtain a prompt alignment indicator for each pair (block 814).

A prompt alignment indicator may be an alignment score indicating, for a given bounding box, how well it is predicted to be aligned to the user's prompt. As mentioned above, a bounding box and prompt may be encoded to a vector space. In some examples, the alignment score is calculated by determining a cosine similarity between the bounding box and the prompt.

The prompt alignment indicators are automatically obtained and then compared to each other in order to determine which bounding box, or bounding boxes, is/are closest to the prompt. In other words, the automated image generation system 234 automatically searches for the closest region, or regions, to the initial text query (regions with the highest level of alignment between the candidate region of interest and the prompt) to obviate or reduce the risk of relevant content being cropped from the square image.

At block 816, the method 800 includes determining at least one region of interest in the square image from among the bounding boxes, and based on the prompt alignment indicators. For example, referring again to FIG. 9, the automated image generation system 234 may determine alignment scores for each of the three bounding boxes, and determine that the bounding box covering both the astronaut and the horse has the highest alignment score (e.g., due to the original prompt referring to both the astronaut and the horse). This bounding box is then selected as the region of interest (in other examples, multiple regions of interest may be selected).

Once the region of interest has been selected by the automated image generation system 234, a cropping region is automatically calculated by the automated image generation system 234 at block 818. As mentioned, the first image has a 1:1 aspect ratio and the required final image is a vertical image with a different aspect ratio. Therefore, the automated image generation system 234 calculates and/or adjusts the cropping region such that it (a) covers the selected region of interest (bounding box) and (b) matches the required new aspect ratio.

In some examples, an initial cropping area that is initialized around the region of interest already matches the required new aspect ratio. In such cases, no further adjustment is required and the cropping region cropped from the square image is the initial cropping area. However, in other examples, the area covering the region of interest is adjusted such that a cropping region matching the required new aspect ratio is obtained. Therefore, the method 800 may include, prior to the cropping operation, adjusting the cropping region such that the cropping region has the second aspect ratio.

Heuristics can be employed for automatic adjustment by the automated image generation system 234. For example, a width of the cropping region may be fixed at an initial width to match the width of the detected region of interest. Height may then be adjusted to reach the required aspect ratio. If using the height of the detected region of interest makes the region "too vertical," rows of pixels may be cut to reduce height. If using the height of the detected region of interest makes the region "too horizontal," rows of pixels may be added to increase height. For example, an equal number of pixels may be cut or added at the top and the bottom of the region. In other examples, a height of the cropping region may be fixed at an initial height matching the height of the detected region of interest. Width may then be adjusted to reach the required aspect ratio. If using the width of the detected region of interest makes the region "too vertical," columns of pixels may be added to increase width. If using the width of the detected region of interest makes the region "too horizontal," columns of pixels may be cut to reduce width. For example, an equal number of pixels may be cut or added on both sides of the region.

In FIG. 9, the detected region of interest is adjusted by fixing the width and adding rows of pixels above and below the original region of interest as required (indicated by the arrows 906 and 908) to arrive at a vertical cropping region 904 with an aspect ratio of 3:2 (height:width), covering the astronaut and the horse, and providing the required aspect ratio.

Referring again to FIG. 8, at block 820, the image processing module 410 processes the first image to obtain a second image with a second aspect ratio. The second image is obtained by cropping the vertical cropping region 904 from the first image. This automatic cropping operation yields the second image, or vertical image, that is presented to the user (block 822). In some examples, the cropped vertical cropping region 904 may be upsampled or downsampled to obtain a desired resolution in the second image for presentation to the user on the user device, e.g., the mobile device 114.

For example, the second image may be presented as part of a plurality of candidate images (image options) in a user interface as shown in FIG. 5. The user thus receives only the part of the AI-generated image shown as the vertical cropping region 904 in FIG. 9. In other words, the user is automatically presented with a vertical image generated based on the original square image. As will be apparent from FIG. 5, the automated image generator 404 may generate multiple images so as to provide the user with options to choose from, and the automated image generation system 234 may convert each such image from a square image to a vertical image in the manner described above.

The user may utilize the generated image for various purposes, e.g., apply the generated image to a user profile or chat profile as described above, in which case the image may be stored as part of the profile data 302. The user may also download and store the generated image in a media library or external storage component. In other examples, the user may include the image in a message sent to the user system 102 of another user of the interaction system 100, in which case the image can be stored as part of message data in the message table 306. The generated image may be used in an augmentation process, e.g., used to augment image data or included in a content item that also includes an augmentation, such as an image filter applied thereto. The method 800 concludes at closing loop block 824.

In some examples, a model that has been trained predominantly, or exclusively, for the generation of images with a first aspect ratio, is fine-tuned for generating images with a second aspect ratio. Merely as an example, the description provided below with reference FIG. 10 refers to fine-tuning a diffusion model to improve its ability to generate vertical images that have an aspect ratio of 3:2 (height:width). However, methodologies described herein may be applied to other types of models and other image aspect ratios and formats.

Figure 10:
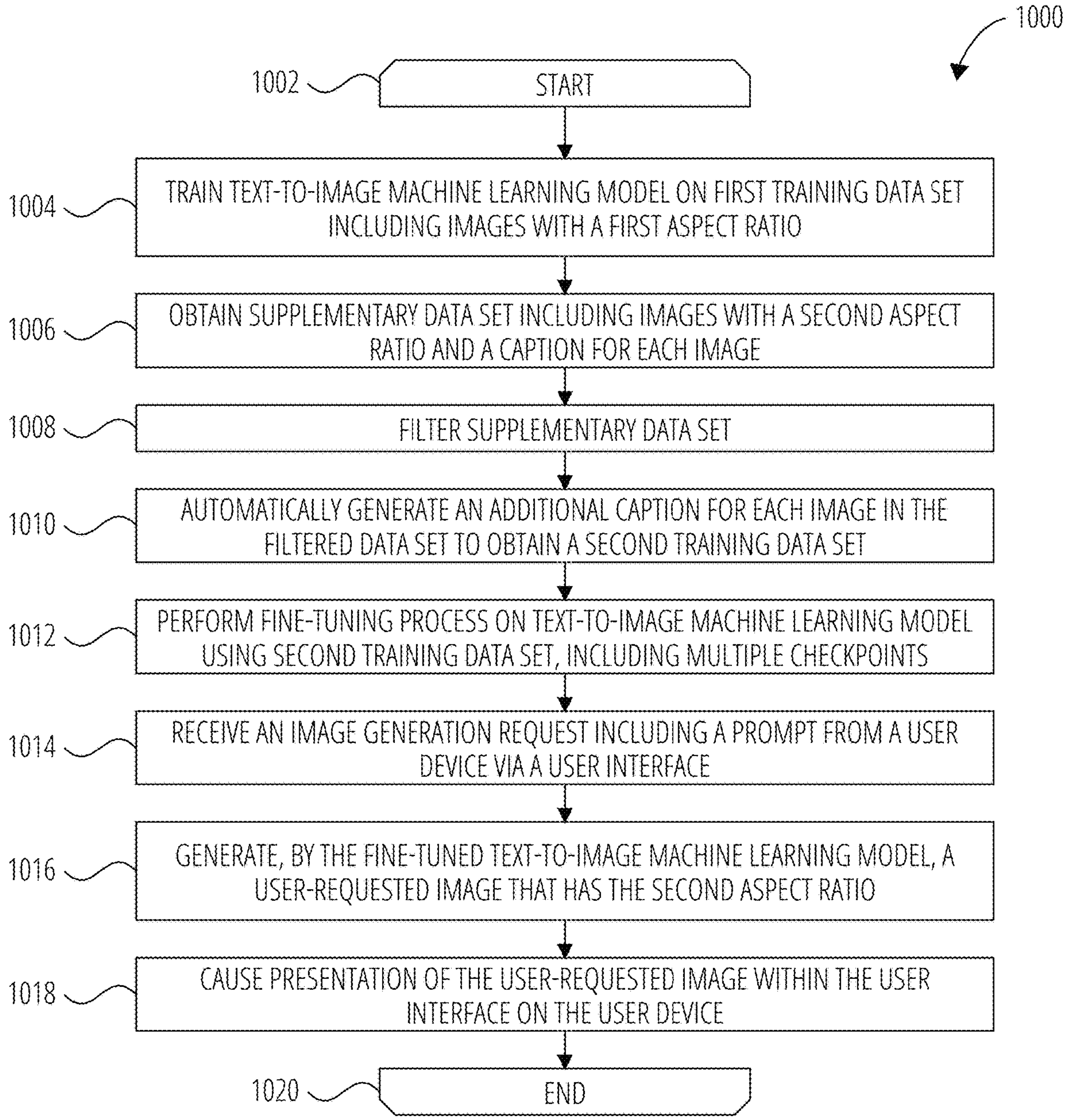
FIG. 10 is a flow diagram illustrating a generative model fine-tuning method, according to some examples.

FIG. 10 is a flow diagram illustrating a generative model fine-tuning method 1000, according to some examples. The method 1000 may be performed by components of the interaction system 100, including the automated image generation system 234.

The method commences at opening loop block 1002 and proceeds to block 1004, where a text-to-image machine learning model in the example form of a diffusion model is trained on a first training data set. The first training data set includes training images and corresponding text descriptions. The training images in the first training data set are square images, thus allowing for the training of the diffusion model to generate high-fidelity square images based on text prompts (e.g., in the manner described above).

It may be desirable to provide users with high-quality vertical images using the diffusion model that has already been trained, e.g., instead of having to train a new model. To improve the quality of the model's vertical image generation capabilities, e.g., reduce the occurrence of duplicated content or items appearing to be cut off, or simply to improve overall aesthetic quality, a fine-tuning process can be carried out.

At block 1006, data preparation commences with the obtaining of a supplementary data set that includes images with the desired second aspect ratio (vertical images) and a caption for each image. A larger data set may be filtered (block 1008) such that only the type and number of data points required for fine-tuning are retained. In the example described with reference to FIG. 10, a larger data set containing millions of data points is filtered by selecting 50,000 data points in which the images have an aspect ratio of 3:2 (height:width), and where each image was predicted to have a high aesthetic quality. (For each image, aesthetic quality can, for example, be predicted by a model trained to predict the rating people would give to the image when asked: "How much do you like this image on a scale from 1 to 10?")

Each of the 50,000 images is paired with a text caption, and these image-text pairs can be used to train or fine-tune a model. To improve the quality of the training data, and as shown in block 1010, an additional text caption for each image in the filtered data set (containing the 50,000 images) is generated using a text-to-image machine learning model, e.g., a model provided by the multimodal encoder-decoder module 412. As mentioned, the multimodal encoder-decoder module 412 may provide an automated caption generator.

The set of 50,000 images, together with the two captions for each image, is referred to below as the second training data set. In other words, the second training data set comprises 50,000 images determined to have a high aesthetic quality, each having a 3:2 vertical aspect ratio, and each having two different text captions.

The first training data set and the second training data set thus differ significantly, e.g., in that the second training data set contains vertical images while the first training data set contains square images, and in that the second training data set has an additional caption for each of its images. In some examples, the first caption for each image is automatically obtained from an online source (or sources) containing the set of 50,000 images, while the second caption is generated based on each image and using the multimodal encoder-decoder module 412. The table 1102 of FIG. 11 includes, merely as an example, four data points from the second training data set. Each data point, or record, includes an image 1104, its auto-collected query 1106, and its auto-generated query 1108. The auto-collected query 1106 may be the "real" caption for each image obtained from the same source as the image itself.

The second training data set is then used to perform the fine-tuning process on the diffusion model (block 1012), with checkpoint saving occurring as explained below. The pre-trained model (trained on the first training data set) is used as a starting point, after which suitable parameters are selected, and the fine-tuning process is carried out by inputting each of the 50,000 images together with its first caption and its second caption separately, thus resulting in 100,000 steps.

Table 1 and Table 2 below show, in simplified form, how examples of outputs generated (as vertical images with a 3:2 aspect ratio) by the diffusion model at different stages can be viewed and compared. Table 1 includes a set of images generated responsive to the prompt: "a beautiful landscape of reunion island painted by greg hildebrand." Table 2 includes a set of images generated responsive to the prompt: "a dog playing on the grass."

The bottom row in each of Table 1 and Table 2 includes outputs generated by the original diffusion model trained on square images (marked with the Model ID "ORIGINAL"), before fine-tuning, while the other rows represent outputs generated at checkpoints included for 9,000 steps ("9K") and 40,000 steps ("40K"), and at the end of the fine-tuning process ("100K"), respectively.

When comparing, for instance, images generated by the model with model ID "ORIGINAL" with the images generated at "100K," the diffusion model may produce outputs with less duplication and less cutting off of items, as well as higher overall aesthetic quality, after the fine-tuning process, due to the model being better trained for vertical image generation. For example, the image entitled "ImageORG-D" in Table 1, generated by the original model, may include unwanted content duplications (e.g., duplicated clouds in the sky) that reduces its overall visual realism, while this may be less apparent in the images generated at "100K," e.g., in the image entitled "IMAGE 100K-D."

TABLE 1

| Model ID | Images based on prompt: "a beautiful landscape of reunion island painted by greg hildebrand." | | | |
|---|---|---|---|---|
| FT-9K | Image9K-A | Image9K-B | Image9K-C | Image9K-D |
| FT-40K | Image40K-A | Image40K-B | Image40K-C | Image40K-D |
| FT-100K | Image100K-A | Image100K-B | Image100K-C | Image100K-D |
| ORIGINAL | ImageORG-A | ImageORG-B | ImageORG-C | ImageORG-D |

As another example, the image in Table 2 that is entitled "ImageORG-C*," generated by the original model, may be seen to "cut off" important subject matter (e.g., a large part of a dog's body), while this issue may not appear in the images generated at "100K."

TABLE 2

| Model ID | Images based on prompt: "a dog playing on the grass." | | | |
|---|---|---|---|---|
| FT-9K | Image9K-A* | Image9K-B* | Image9K-C* | Image9K-D |
| FT-40K | Image40K-A* | Image40K-B* | Image40K-C* | Image40K-D* |
| FT-100K | Image100K-A* | Image100K-B* | Image100K-C* | Image100K-D* |
| ORIGINAL | ImageORG-A* | ImageORG-B* | ImageORG-C* | ImageORG-D* |

Returning now to FIG. 10, the fine-tuned diffusion model may be used to generate vertical images responsive to user queries. The method 1000 includes, at block 1014, receiving an image generation request from a user device. The request includes a prompt, e.g., a sentence describing what the user wants to see in the image. For example, and referring to FIG. 5 and FIG. 6, the user's prompt may be: "A castle landscape, Middle Ages." In response (at block 1016), the fine-tuned diffusion model may generate a vertical image or multiple vertical images, e.g., similar to those shown in FIG. 5.

At block 1018, the user-requested image is presented within a user interface on the user device. As mentioned above, the user may utilize the generated image for various purposes, e.g., apply the generated image to a user profile or chat profile as described above, download and store the generated image in a media library or external storage component, include the image in a message, or use the image as part of an image augmentation feature. The method 1000 concludes at closing loop block 1020.

Machine Learning Program

Figure 12:
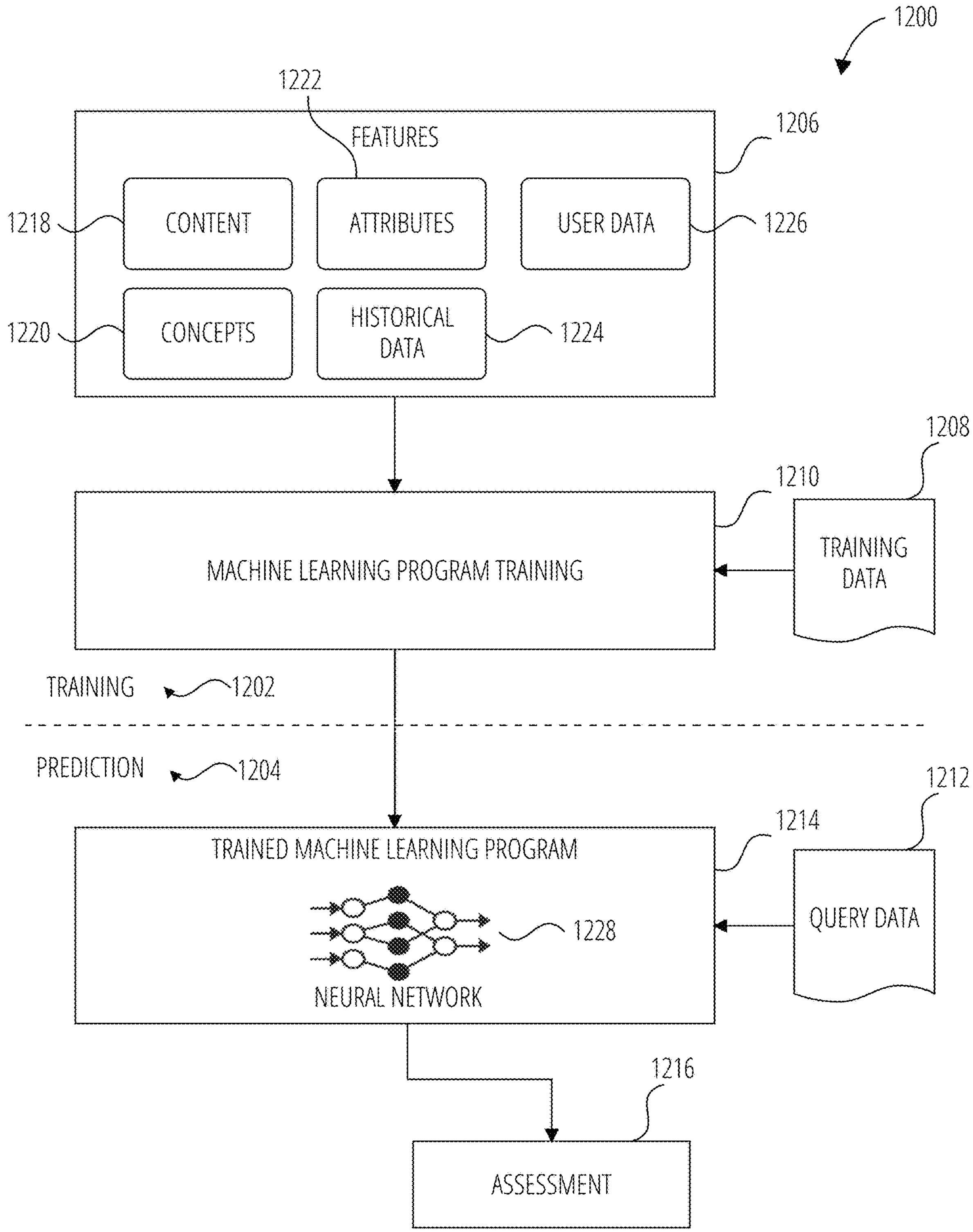
FIG. 12 is a diagrammatic illustration of training and use of a machine learning program, according to some examples.

FIG. 12 is a block diagram showing a machine learning program 1200, according to some examples. The machine learning programs 1200, also referred to as machine learning algorithms or tools, are used as part of the systems described herein to perform operations associated with searches and query responses.

Machine learning is a field of study that gives computers the ability to learn without being explicitly programmed. Machine learning explores the study and construction of algorithms, also referred to herein as tools, that may learn from or be trained using existing data and make predictions about or based on new data. Such machine learning tools operate by building a model from example training data 1208 in order to make data-driven predictions or decisions expressed as outputs or assessments (e.g., assessment 1216). Although examples are presented with respect to a few machine learning tools, the principles presented herein may be applied to other machine learning tools.

In some examples, different machine learning tools may be used. For example, Logistic Regression (LR), Naive-Bayes, Random Forest (RF), neural networks (NN), matrix factorization, and Support Vector Machines (SVM) tools may be used.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine learning program 1200 supports two types of phases, namely training phases 1202 and prediction phases 1204. In training phases 1202, supervised learning, unsupervised or reinforcement learning may be used. For example, the machine learning program 1200 (1) receives features 1206 (e.g., as structured or labeled data in supervised learning) and/or (2) identifies features 1206 (e.g., unstructured or unlabeled data for unsupervised learning) in training data 1208. In prediction phases 1204, the machine learning program 1200 uses the features 1206 for analyzing query data 1212 to generate outcomes or predictions, as examples of an assessment 1216.

In the training phase 1202, feature engineering is used to identify features 1206 and may include identifying informative, discriminating, and independent features for the effective operation of the machine learning program 1200 in pattern recognition, classification, and regression. In some examples, the training data 1208 includes labeled data, which is known data for pre-identified features 1206 and one or more outcomes. Each of the features 1206 may be a variable or attribute, such as individual measurable property of a process, article, system, or phenomenon represented by a data set (e.g., the training data 1208). Features 1206 may also be of different types, such as numeric features, strings, and graphs, and may include one or more of content 1218, concepts 1220, attributes 1222, historical data 1224 and/or user data 1226, merely for example.

The concept of a feature in this context is related to that of an explanatory variable used in statistical techniques such as linear regression. Choosing informative, discriminating, and independent features is important for the effective operation of the machine learning program 1200 in pattern recognition, classification, and regression. Features may be of different types, such as numeric features, strings, and graphs.

In training phases 1202, the machine learning program 1200 uses the training data 1208 to find correlations among the features 1206 that affect a predicted outcome or assessment 1216.

With the training data 1208 and the identified features 1206, the machine learning program 1200 is trained during the training phase 1202 at machine learning program training 1210. The machine learning program 1200 appraises values of the features 1206 as they correlate to the training data 1208. The result of the training is the trained machine learning program 1214 (e.g., a trained or learned model).

Further, the training phases 1202 may involve machine learning, in which the training data 1208 is structured (e.g., labeled during preprocessing operations), and the trained machine learning program 1214 implements a relatively simple neural network 1228 capable of performing, for example, classification and clustering operations. In other examples, the training phase 1202 may involve deep learning, in which the training data 1208 is unstructured, and the trained machine learning program 1214 implements a deep neural network 1228 that is able to perform both feature extraction and classification/clustering operations.

A neural network 1228 generated during the training phase 1202, and implemented within the trained machine learning program 1214, may include a hierarchical (e.g., layered) organization of neurons. For example, neurons (or nodes) may be arranged hierarchically into a number of layers, including an input layer, an output layer, and multiple hidden layers. Each of the layers within the neural network 1228 can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network 1228 may also be one of a number of different types of neural networks, including a single-layer feed-forward network, an Artificial Neural Network (ANN), a Recurrent Neural Network (RNN), a symmetrically connected neural network, and unsupervised pre-trained network, a Convolutional Neural Network (CNN), a Recursive Neural Network (RNN), a VAE, a GAN, or an autoregressive model, merely for example.

During prediction phases 1204, the trained machine learning program 1214 is used to perform an assessment. Query data 1212 is provided as an input to the trained machine learning program 1214, and the trained machine learning program 1214 generates the assessment 1216 as output, responsive to receipt of the query data 1212.

In some examples, a trained machine learning program 1214 can be used for automated image generation as described in the present disclosure. Automated image generation, and specifically text-guided AI-driven image generation, can be achieved using different types of machine learning programs (or models). As mentioned elsewhere, examples of these include VAEs, GANs, autoregressive models, and diffusion models.

A VAE is an unsupervised machine learning program that generates an image by processing a text prompt and mapping it to a latent space representation. The latest space representation may then be used to generate an image that corresponds to the text prompt. VAEs are designed to learn the distribution of a dataset and apply that to generate new images likely to conform more closely to the dataset.

A GAN is a generative model that comprises a generator and a discriminator. The generator may generate images based on text prompts, and the discriminator may evaluate the generated images for realism and/or other metrics, depending on the implementation. The generator and discriminator are trained simultaneously to generate images aimed at closely matching the input text prompt. The generator generates an image that is intended to deceive the discriminator into designating the image as "real," while the discriminator generates an image to evaluate the realism of the generator's output. In this way, both networks can be optimized towards their objectives and improve the quality of the generated images.

Autoregressive models generate images pixel by pixel, where each pixel is generated based on the previous pixels. Autoregressive models may be trained, for example, using maximum likelihood estimation (MLE) to learn the conditional probability distribution of each pixel in an image given its previous pixels.

Diffusion models, as described in greater detail above, are generative models that generate images by diffusing noise over time. The program may take in a text prompt and generate a noise vector, which is then diffused over a set number of time steps to generate an image.

In some examples, a diffusion-based model may also take an image as an input to produce a generated image that is conditioned on the input image and the relevant text. In this way, an AI-generated image can be seeded with an initial image such as a drawing or photograph, with the model being instructed to build or generate a new image on top of, or conditioned on, the input image, e.g., to preserve a general shape or layout of the input image. While a text-to-image diffusion technique that does not utilize an input image may commence the diffusion process with pure noise and progressively refine the generated image, using an input image may allow for some earlier steps to be skipped, e.g., by commencing with the input image mixed with Gaussian noise.

Data Communications Architecture

Figure 13:
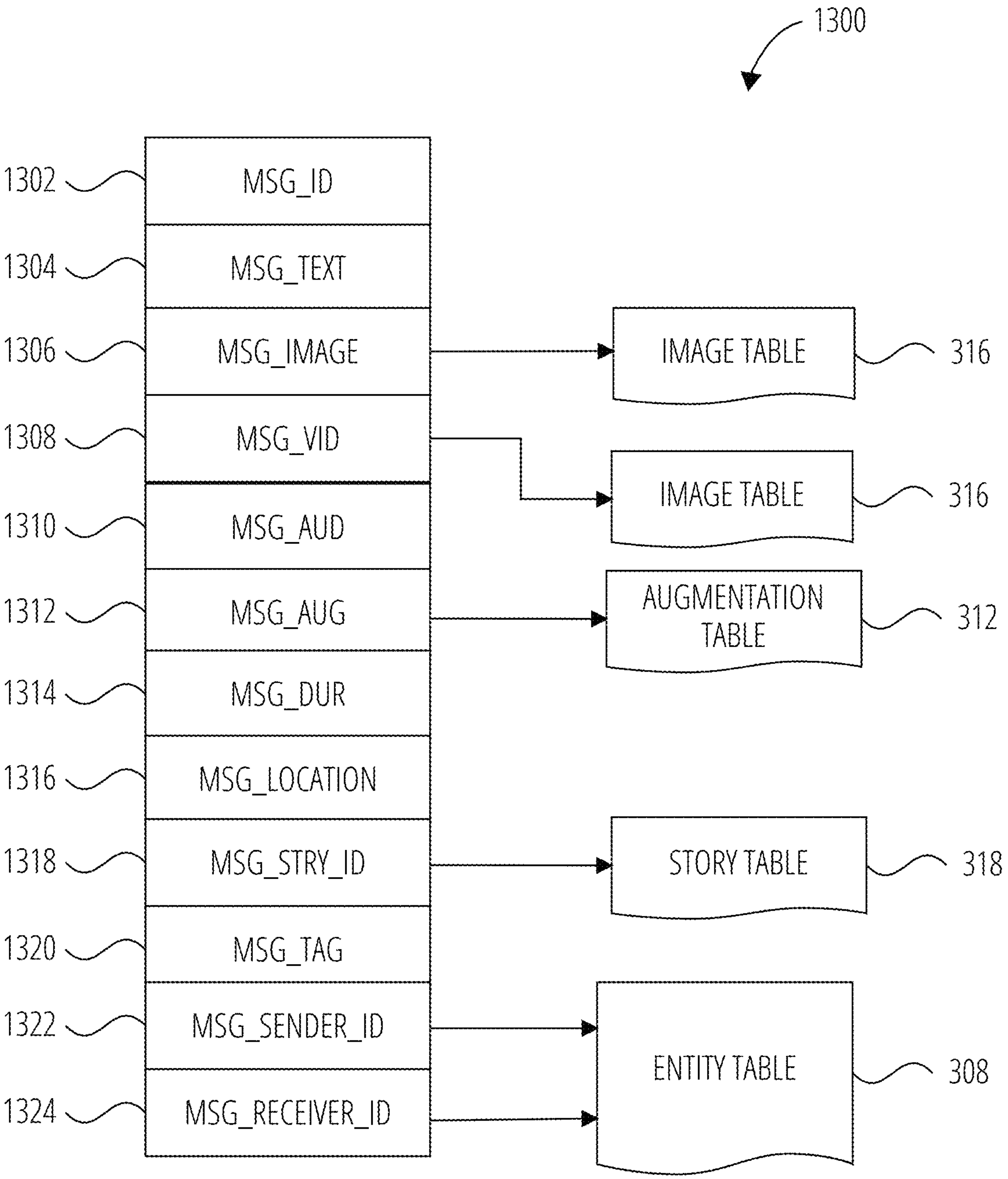
FIG. 13 is a diagrammatic representation of a message, according to some examples.

FIG. 13 is a schematic diagram illustrating a structure of a message 1300, according to some examples, generated by an interaction client 104 for communication to a further interaction client 104 via the interaction servers 124. The content of a particular message 1300 is used to populate the message table 306 stored within the database 304, accessible by the interaction servers 124. Similarly, the content of a message 1300 is stored in memory as "in-transit" or "in-flight" data of the user system 102 or the interaction servers 124. A message 1300 is shown to include the following example components:

- Message identifier 1302: a unique identifier that identifies the message 1300.
- Message text payload 1304: text, to be generated by a user via a user interface of the user system 102, and that is included in the message 1300.
- Message image payload 1306: image data, captured by a camera component of a user system 102 or retrieved from a memory component of a user system 102, and that is included in the message 1300. Image data for a sent or received message 1300 may be stored in the image table 316.

Message video payload 1308: video data, captured by a camera component or retrieved from a memory component of the user system 102, and that is included in the message 1300. Video data for a sent or received message 1300 may be stored in the image table 316.

Message audio payload 1310: audio data, captured by a microphone or retrieved from a memory component of the user system 102, and that is included in the message 1300.

Message augmentation data 1312: augmentation data (e.g., filters, stickers, or other annotations or enhancements) that represents augmentations to be applied to message image payload 1306, message video payload 1308, or message audio payload 1310 of the message 1300. Augmentation data for a sent or received message 1300 may be stored in the augmentation table 312.

Message duration parameter 1314: parameter value indicating, in seconds, the amount of time for which content of the message (e.g., the message image payload 1306, message video payload 1308, message audio payload 1310) is to be presented or made accessible to a user via the interaction client 104.

Message geolocation parameter 1316: geolocation data (e.g., latitudinal and longitudinal coordinates) associated with the content payload of the message. Multiple message geolocation parameter 1316 values may be included in the payload, each of these parameter values being associated with respect to content items included in the content (e.g., a specific image within the message image payload 1306, or a specific video in the message video payload 1308).

Message story identifier 1318: identifier values identifying one or more content collections (e.g., "stories" identified in the story table 318) with which a particular content item in the message image payload 1306 of the message 1300 is associated. For example, multiple images within the message image payload 1306 may each be associated with multiple content collections using identifier values.

Message tag 1320: each message 1300 may be tagged with multiple tags, each of which is indicative of the subject matter of content included in the message payload. For example, where a particular image included in the message image payload 1306 depicts an animal (e.g., a lion), a tag value may be included within the message tag 1320 that is indicative of the relevant animal. Tag values may be generated manually, based on user input, or may be automatically generated using, for example, image recognition.

Message sender identifier 1322: an identifier (e.g., a messaging system identifier, email address, or device identifier) indicative of a user of the user system 102 on which the message 1300 was generated and from which the message 1300 was sent.

Message receiver identifier 1324: an identifier (e.g., a messaging system identifier, email address, or device identifier) indicative of a user of the user system 102 to which the message 1300 is addressed.

The contents (e.g., values) of the various components of message 1300 may be pointers to locations in tables within which content data values are stored. For example, an image value in the message image payload 1306 may be a pointer to (or address of) a location within an image table 316. Similarly, values within the message video payload 1308 may point to data stored within an image table 316, values stored within the message augmentation data 1312 may point to data stored in an augmentation table 312, values stored within the message story identifier 1318 may point to data stored in a story table 318, and values stored within the message sender identifier 1322 and the message receiver identifier 1324 may point to user records stored within an entity table 308.

System with Head-Wearable Apparatus

Figure 14:
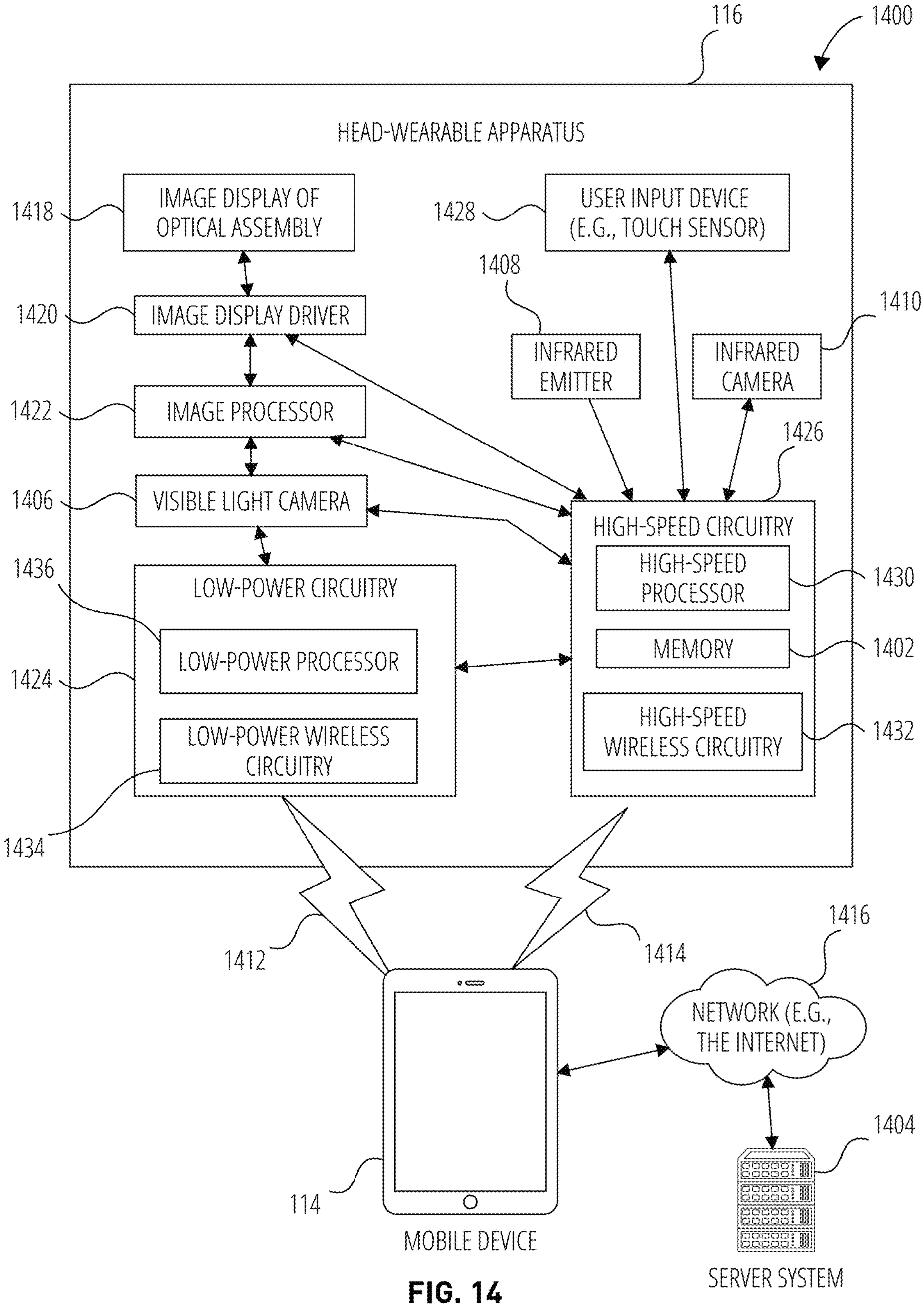
FIG. 14 is a diagrammatic representation of a system including a head-wearable apparatus, according to some examples.

FIG. 14 illustrates a system 1400 including a head-wearable apparatus 116 with a selector input device, according to some examples. FIG. 14 is a high-level functional block diagram of an example head-wearable apparatus 116 communicatively coupled to a mobile device 114 and various server systems 1404 (e.g., the interaction server system 110) via various networks 108.

The head-wearable apparatus 116 includes one or more cameras, each of which may be, for example, a visible light camera 1406, an infrared emitter 1408, and an infrared camera 1410.

The mobile device 114 connects with head-wearable apparatus 116 using both a low-power wireless connection 1412 and a high-speed wireless connection 1414. The mobile device 114 is also connected to the server system 1404 and the network 1416.

The head-wearable apparatus 116 further includes two image displays of the image display of optical assembly 1418. The two image displays of optical assembly 1418 include one associated with the left lateral side and one associated with the right lateral side of the head-wearable apparatus 116. The head-wearable apparatus 116 also includes an image display driver 1420, an image processor 1422, low-power circuitry 1424, and high-speed circuitry 1426. The image display of optical assembly 1418 is for presenting images and videos, including an image that can include a graphical user interface to a user of the head-wearable apparatus 116.

The image display driver 1420 commands and controls the image display of optical assembly 1418. The image display driver 1420 may deliver image data directly to the image display of optical assembly 1418 for presentation or may convert the image data into a signal or data format suitable for delivery to the image display device. For example, the image data may be video data formatted according to compression formats, such as H.264 (MPEG-4 Part 10), HEVC, Theora, Dirac, Real Video RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1428 (e.g., touch sensor or push button), including an input surface on the head-wearable apparatus 116. The user input device 1428 (e.g., touch sensor or push button) is to receive from the user an input selection to manipulate the graphical user interface of the presented image.

The components shown in FIG. 14 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1406 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1402, which stores instructions to perform a subset or all of the functions described herein. The memory 1402 can also include a storage device.

As shown in FIG. 14, the high-speed circuitry 1426 includes a high-speed processor 1430, a memory 1402, and high-speed wireless circuitry 1432. In some examples, the image display driver 1420 is coupled to the high-speed circuitry 1426 and operated by the high-speed processor 1430 in order to drive the left and right image displays of the image display of optical assembly 1418. The high-speed processor 1430 may be any processor capable of managing high-speed communications and operation of any general computing system needed for the head-wearable apparatus 116. The high-speed processor 1430 includes processing resources needed for managing high-speed data transfers on a high-speed wireless connection 1414 to a wireless local area network (WLAN) using the high-speed wireless circuitry 1432. In certain examples, the high-speed processor 1430 executes an operating system such as a LINUX operating system or other such operating system of the head-wearable apparatus 116, and the operating system is stored in the memory 1402 for execution. In addition to any other responsibilities, the high-speed processor 1430 executing a software architecture for the head-wearable apparatus 116 is used to manage data transfers with high-speed wireless circuitry 1432. In certain examples, the high-speed wireless circuitry 1432 is configured to implement Institute of Electrical and Electronic Engineers (IEEE) 802.11 communication standards, also referred to herein as WiFi. In some examples, other high-speed communications standards may be implemented by the high-speed wireless circuitry 1432.

The low-power wireless circuitry 1434 and the high-speed wireless circuitry 1432 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 1412 and the high-speed wireless connection 1414, may be implemented using details of the architecture of the head-wearable apparatus 116, as can other elements of the network 1416.

The memory 1402 includes any storage device capable of storing various data and applications, including, among other things, camera data generated by the left and right visible light cameras 1406, the infrared camera 1410, and the image processor 1422, as well as images generated for display by the image display driver 1420 on the image displays of the image display of optical assembly 1418. While the memory 1402 is shown as integrated with high-speed circuitry 1426, in some examples, the memory 1402 may be an independent standalone element of the head-wearable apparatus 116. In certain such examples, electrical routing lines may provide a connection through a chip that includes the high-speed processor 1430 from the image processor 1422 or the low-power processor 1436 to the memory 1402. In some examples, the high-speed processor 1430 may manage addressing of the memory 1402 such that the low-power processor 1436 will boot the high-speed processor 1430 any time that a read or write operation involving memory 1402 is needed.

As shown in FIG. 14, the low-power processor 1436 or high-speed processor 1430 of the head-wearable apparatus 116 can be coupled to the camera (visible light camera 1406, infrared emitter 1408, or infrared camera 1410), the image display driver 1420, the user input device 1428 (e.g., touch sensor or push button), and the memory 1402.

The head-wearable apparatus 116 is connected to a host computer. For example, the head-wearable apparatus 116 is paired with the mobile device 114 via the high-speed wireless connection 1414 or connected to the server system 1404 via the network 1416. The server system 1404 may be one or more computing devices as part of a service or network computing system, for example, that includes a processor, a memory, and network communication interface to communicate over the network 1416 with the mobile device 114 and the head-wearable apparatus 116.

The mobile device 114 includes a processor and a network communication interface coupled to the processor. The network communication interface allows for communication over the network 1416, low-power wireless connection 1412, or high-speed wireless connection 1414. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1420. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1404, such as the user input device 1428, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1412 and high-speed wireless connection 1414 from the mobile device 114 via the low-power wireless circuitry 1434 or high-speed wireless circuitry 1432.

Machine Architecture

Figure 15:
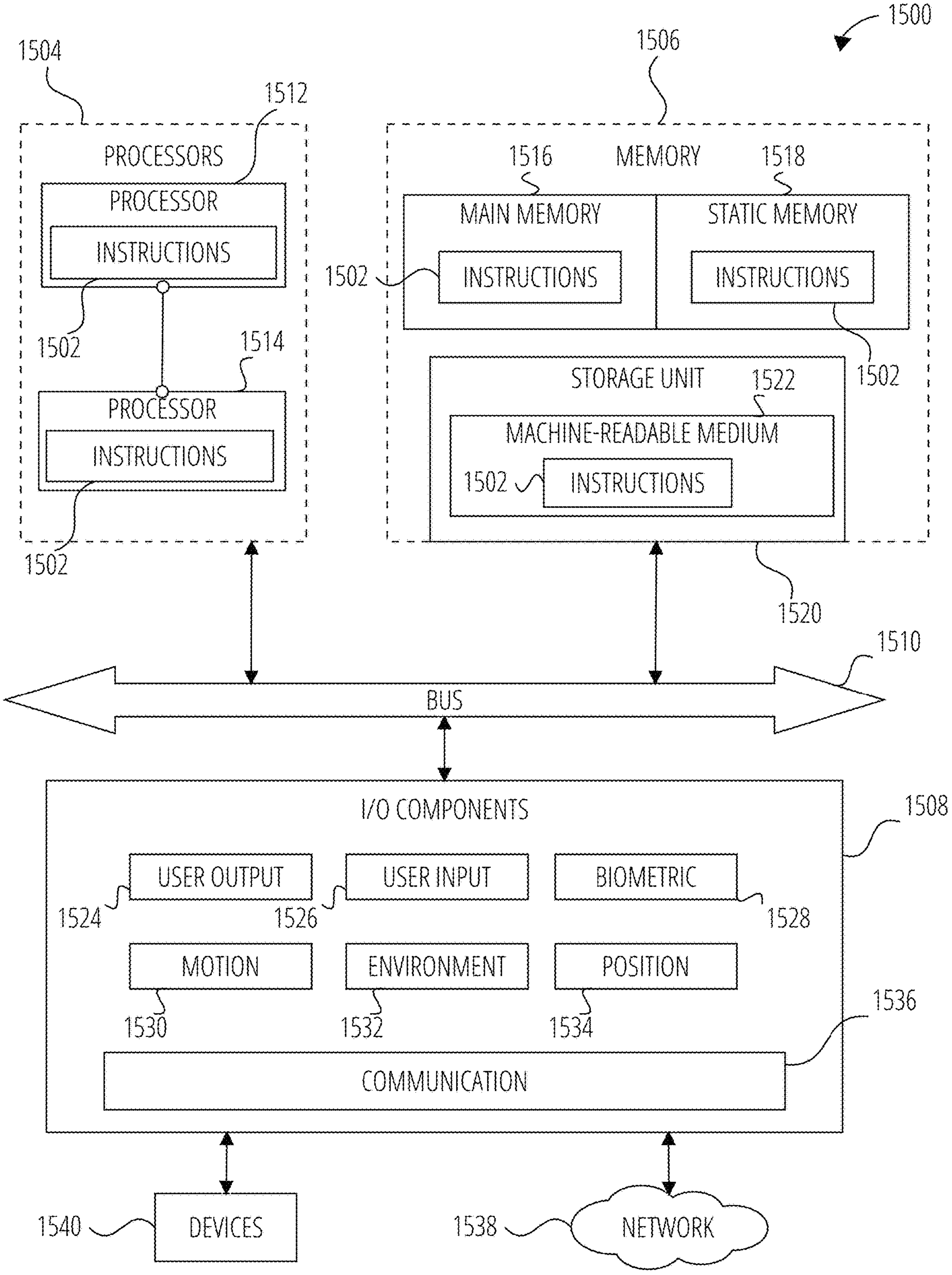
FIG. 15 is a diagrammatic representation of a machine in the form of a computer system within which a set of instructions may be executed to cause the machine to perform any one or more of the methodologies discussed herein, according to some examples.

FIG. 15 is a diagrammatic representation of the machine 1500 within which instructions 1502 (e.g., software, a program, an application, an applet, an app, or other executable code) for causing the machine 1500 to perform any one or more of the methodologies discussed herein may be executed. For example, the instructions 1502 may cause the machine 1500 to execute any one or more of the methods described herein. The instructions 1502 transform the general, non-programmed machine 1500 into a particular machine 1500 programmed to carry out the described and illustrated functions in the manner described. The machine 1500 may operate as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1502, sequentially or otherwise, that specify actions to be taken by the machine 1500. Further, while a single machine 1500 is illustrated, the term "machine" shall also be taken to include a collection of machines that individually or jointly execute the instructions 1502 to perform any one or more of the methodologies discussed herein. The machine 1500, for example, may comprise the user system 102 or any one of multiple server devices forming part of the interaction server system 110. In some examples, the machine 1500 may also comprise both client and server systems, with certain operations of a particular method or algorithm being performed on the server-side and with certain operations of the particular method or algorithm being performed on the client-side.

The machine 1500 may include processors 1504, memory 1506, and input/output I/O components 1508, which may be configured to communicate with each other via a bus 1510. In an example, the processors 1504 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1512 and a processor 1514 that execute the instructions 1502. The term "processor" is intended to include multi-core processors that may comprise two or more independent processors (sometimes referred to as "cores") that may execute instructions contemporaneously. Although FIG. 15 shows multiple processors 1504, the machine 1500 may include a single processor with a single-core, a single processor with multiple cores (e.g., a multi-core processor), multiple processors with a single core, multiple processors with multiples cores, or any combination thereof.

The memory 1506 includes a main memory 1516, a static memory 1518, and a storage unit 1520, both accessible to the processors 1504 via the bus 1510. The main memory 1506, the static memory 1518, and storage unit 1520 store the instructions 1502 embodying any one or more of the methodologies or functions described herein. The instructions 1502 may also reside, completely or partially, within the main memory 1516, within the static memory 1518, within machine-readable medium 1522 within the storage unit 1520, within at least one of the processors 1504 (e.g., within the processor's cache memory), or any suitable combination thereof, during execution thereof by the machine 1500.

The I/O components 1508 may include a wide variety of components to receive input, provide output, produce output, transmit information, exchange information, capture measurements, and so on. The specific I/O components 1508 that are included in a particular machine will depend on the type of machine. For example, portable machines such as mobile phones may include a touch input device or other such input mechanisms, while a headless server machine will likely not include such a touch input device. It will be appreciated that the I/O components 1508 may include many other components that are not shown in FIG. 15. In various examples, the I/O components 1508 may include user output components 1524 and user input components 1526. The user output components 1524 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1526 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1508 may include biometric components 1528, motion components 1530, environmental components 1532, or position components 1534, among a wide array of other components. For example, the biometric components 1528 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1530 include acceleration sensor components (e.g., accelerometer), gravitation sensor components, rotation sensor components (e.g., gyroscope).

The environmental components 1532 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple camera systems may include a wide camera, an ultra-wide camera, a telephoto camera, a macro camera, and a depth sensor, for example.

The position components 1534 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1508 further include communication components 1536 operable to couple the machine 1500 to a network 1538 or devices 1540 via respective coupling or connections. For example, the communication components 1536 may include a network interface component or another suitable device to interface with the network 1538. In further examples, the communication components 1536 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1540 may be another machine or any of a wide variety of peripheral devices (e.g., a peripheral device coupled via a USB).

Moreover, the communication components 1536 may detect identifiers or include components operable to detect identifiers. For example, the communication components 1536 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1536, such as location via Internet Protocol (IP) geolocation, location via Wi-Fi® signal triangulation, location via detecting an NFC beacon signal that may indicate a particular location, and so forth.

The various memories (e.g., main memory 1516, static memory 1518, and memory of the processors 1504) and storage unit 1520 may store one or more sets of instructions and data structures (e.g., software) embodying or used by any one or more of the methodologies or functions described herein. These instructions (e.g., the instructions 1502), when executed by processors 1504, cause various operations to implement the disclosed examples.

The instructions 1502 may be transmitted or received over the network 1538, using a transmission medium, via a network interface device (e.g., a network interface component included in the communication components 1536) and using any one of several well-known transfer protocols (e.g., hypertext transfer protocol (HTTP)). Similarly, the instructions 1502 may be transmitted or received using a transmission medium via a coupling (e.g., a peer-to-peer coupling) to the devices 1540.

Software Architecture

Figure 16:
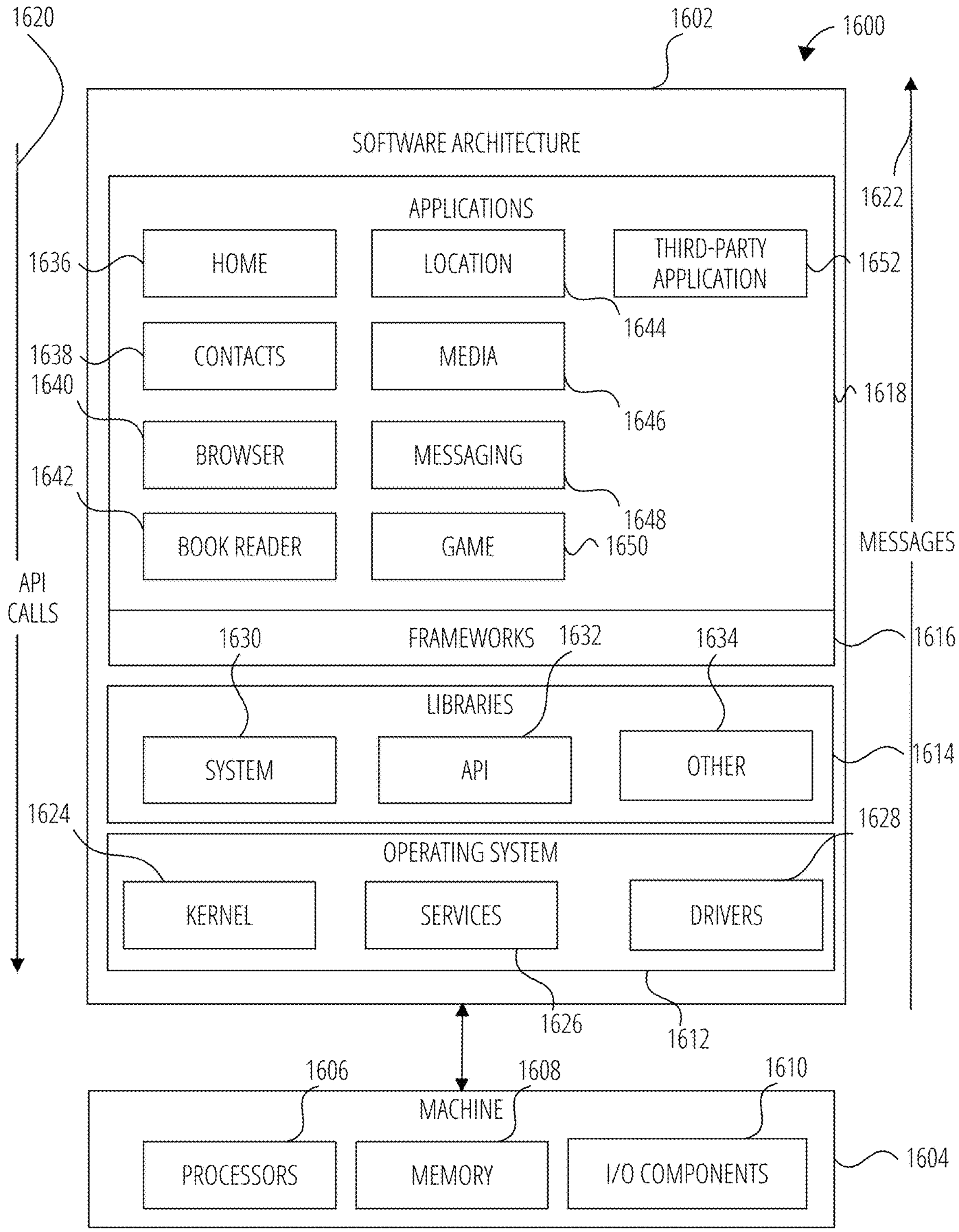
FIG. 16 is a block diagram showing a software architecture within which examples may be implemented.

FIG. 16 is a block diagram 1600 illustrating a software architecture 1602, which can be installed on any one or more of the devices described herein. The software architecture 1602 is supported by hardware such as a machine 1604 that includes processors 1606, memory 1608, and I/O components 1610. In this example, the software architecture 1602 can be conceptualized as a stack of layers, where each layer provides a particular functionality. The software architecture 1602 includes layers such as an operating system 1612, libraries 1614, frameworks 1616, and applications 1618. Operationally, the applications 1618 invoke API calls 1620 through the software stack and receive messages 1622 in response to the API calls 1620.

The operating system 1612 manages hardware resources and provides common services. The operating system 1612 includes, for example, a kernel 1624, services 1626, and drivers 1628. The kernel 1624 acts as an abstraction layer between the hardware and the other software layers. For example, the kernel 1624 provides memory management, processor management (e.g., scheduling), component management, networking, and security settings, among other functionalities. The services 1626 can provide other common services for the other software layers. The drivers 1628 are responsible for controlling or interfacing with the underlying hardware. For instance, the drivers 1628 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1614 provide a common low-level infrastructure used by the applications 1618. The libraries 1614 can include system libraries 1630 (e.g., C standard library) that provide functions such as memory allocation functions, string manipulation functions, mathematic functions, and the like. In addition, the libraries 1614 can include API libraries 1632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1614 can also include a wide variety of other libraries 1634 to provide many other APIs to the applications 1618.

The frameworks 1616 provide a common high-level infrastructure that is used by the applications 1618. For example, the frameworks 1616 provide various graphical user interface (GUI) functions, high-level resource management, and high-level location services. The frameworks 1616 can provide a broad spectrum of other APIs that can be used by the applications 1618, some of which may be specific to a particular operating system or platform.

In an example, the applications 1618 may include a home application 1636, a contacts application 1638, a browser application 1640, a book reader application 1642, a location application 1644, a media application 1646, a messaging application 1648, a game application 1650, and a broad assortment of other applications such as a third-party application 1652. The applications 1618 are programs that execute functions defined in the programs. Various programming languages can be employed to create one or more of the applications 1618, structured in a variety of manners, such as object-oriented programming languages (e.g., Objective-C, Java, or C++) or procedural programming languages (e.g., C or assembly language). In a specific example, the third-party application 1652 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1652 can invoke the API calls 1620 provided by the operating system 1612 to facilitate functionalities described herein.

Conclusion

Examples of the present disclosure thus allow users to be provided with automatically generated images. In some examples, an automated image generation system can be used to generate images with a first aspect ratio. The system can also convert images to a second aspect ratio. In this way, image quality may be improved without "forcing" an automated image generator to generate images in the second aspect ratio.

In some examples, the conversion functionality may be selectively applied, thus providing users with more flexibility and image format options.

In some examples, a text-to-image machine learning model is fine-tuned to improve the quality of images generated in a certain format, e.g., vertical images.

A technical problem of improving the quality of images generated by an automated image generator can thus be improved. Further, when the effects in this disclosure are considered in aggregate, one or more of the methodologies described herein may not only improve image quality, but also (or alternatively) obviate a need for certain efforts or resources that otherwise would be involved in automated image generation. Computing resources used by one or more machines, databases, or networks may be more efficiently utilized or even reduced, e.g., as a result of a user not having to manually modify and re-submit prompts in an attempt to obtain better images or images that are more closely aligned to what the user has in mind, or as a result of a user not having to manually adjust images to a desired aspect ratio or to remove problematic parts. Examples of such computing resources may include processor cycles, network traffic, memory usage, graphics processing unit (GPU) resources, data storage capacity, power consumption, and cooling capacity.

Examples described herein refer to embeddings. An embedding is a mathematical representation of a feature or input data that allows it to be processed by, or facilitates processing thereof, by a machine learning algorithm. In some examples, an embedding is a mapping of high-dimensional input data to a lower-dimensional space, where the data can be more easily processed. It should be appreciated that, in some examples, where references are made to encoding text, e.g., creating embeddings, pre-processing steps may be carried out automatically (or in some cases manually) prior to such encoding. This may include pre-processing actions such as removing stop words, stemming, or lowercasing.

Further, while examples described herein focus on image generation, it will be appreciated that techniques described herein may be applied to video generation (e.g., automatically generating a video, comprising a sequence of digital image frames, based on an input prompt).

As used in this disclosure, the term "aesthetic quality" refers to a measure or score indicating how visually appealing or pleasing an AI-generated image is to a human observer. It can be measured through subjective evaluation methods, such as surveys or human assessments, or through objective evaluation methods, such as using metrics such as Structural Similarity Index. In some examples, an aesthetic quality score can be referred to as a visual realism score. In other examples, a visual realism score may be based on a different metric than a metric for aesthetic quality. For instance, visual realism may be based at least partially on whether an image contains artifacts or other unwanted issues as described elsewhere herein.

As used in this disclosure, the term "alignment" refers to how well an AI-generated image corresponds to a given prompt, including, for example, how well the generated image captures the semantic and visual context of the prompt and/or how well it follows the intended category, context or style. It can be measured using human evaluation or through objective metrics such as distance metrics.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Processor" refers, for example, to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a manner as to encode information in the signal. The terms "transmission medium" and "signal medium" mean the same thing and may be used interchangeably in this disclosure.

"Text object" refers to, for example, any character or sequence of characters. A text object may thus include letters, numbers, punctuation, and other symbols. A text object can represent a single character, a word, or a longer string of text.

"User device" refers, for example, to a device accessed, controlled or owned by a user and with which the user interacts to perform an action, or an interaction with other users or computer systems.

What is claimed is:

1. A method comprising:

receiving, from a user device, an image generation request comprising a prompt;

responsive to receiving the image generation request, generating, by a processor-implemented automated image generator and based on the prompt, a first image having a first aspect ratio;

determining two or more candidate regions of interest in the first image;

encoding, by a text encoder, the prompt to obtain an embedding of the prompt;

encoding, by an image encoder, each of the two or more candidate regions of interest to obtain an embedding of the candidate region of interest;

comparing the embedding of each of the two or more candidate regions of interest with the embedding of the prompt to obtain a prompt alignment indicator for each of the two or more candidate regions of interest in the first image, the prompt alignment indicator indicating a level of alignment between each candidate region of interest and the prompt;

determining a target region of interest among the two or more candidate regions of interest in the first image, the target region of interest being determined automatically based on a comparison among two or more prompt alignment indicators for the two or more candidate regions of interest;

cropping the first image at the target region of interest to obtain a second image, the second image having a second aspect ratio that is different from the first aspect ratio; and causing presentation of the second image on the user device.

2. The method of claim 1, wherein the prompt is a text prompt.

3. The method of claim 1, wherein the processor-implemented automated image generator comprises a text-to-image machine learning model.

4. The method of claim 1, further comprising, prior to the cropping of the first image to obtain the second image, upsampling the first image by applying a uniform scaling factor to a width and a height of the first image.

5. The method of claim 1, wherein each candidate region of interest of the two or more candidate regions of interest is generated as a bounding box with respect to the first image.

6. The method of claim 1, wherein the prompt alignment indicator is an alignment score.

7. The method of claim 1, further comprising: prior to the cropping, automatically adjusting the cropping region such that the cropping region has the second aspect ratio.

8. The method of claim 1, wherein the receiving the image generation request comprises:

causing presentation of an input text box in a user interface provided by an interaction client executing on the user device; and receiving user input comprising the prompt via the input text box in the user interface, wherein the causing presentation of the second image on the user device comprises causing presentation of the second image in the user interface provided by the interaction client.

9. The method of claim 1, wherein the first aspect ratio is a 1:1 aspect ratio.

10. The method of claim 1, wherein the second aspect ratio has a height that is greater than its width.

11. The method of claim 1, wherein the processor-implemented automated image generator comprises a text-to-image machine learning model, the text-to-image machine learning model being trained using a training data set comprising a plurality of training images, each training image having a corresponding text description forming part of the training data set.

12. The method of claim 1, wherein the prompt alignment indicator for the candidate region of interest comprises a cosine similarity between the embedding of the candidate region of interest and the embedding of the prompt.

13. The method of claim 1, wherein the prompt is randomly generated in response to a user selection of an interactive element in a user interface.

14. The method of claim 3, wherein the text-to-image machine learning model is a diffusion model.

15. The method of claim 10, wherein the second aspect ratio is a height: width ratio of 3:2.

16. The method of claim 11, wherein, for each training image, the corresponding text description comprises a first text description and a second text description, the first text description being different from the second text description, and the second text description being a caption generated using a processor-implemented automated caption generator.

17. The method of claim 16, wherein the processor-implemented automated caption generator comprises an image-to-text machine learning model.

18. A system comprising a memory storing instructions and one or more processors configured by the instructions to perform operations comprising:

receiving, from a user device, an image generation request comprising a prompt;

responsive to receiving the image generation request, generating, by a processor-implemented automated image generator and based on the prompt, a first image having a first aspect ratio;

determining two or more candidate regions of interest in the first image;

encoding, by a text encoder, the prompt to obtain an embedding of the prompt;

encoding, by an image encoder, each of the two or more candidate regions of interest to obtain an embedding of the candidate region of interest;

comparing the embedding of each of the two or more candidate regions of interest with the embedding of the prompt to obtain a prompt alignment indicator for each of the two or more candidate regions of interest in the first image, the prompt alignment indicator indicating a level of alignment between each candidate region of interest and the prompt;

determining a target region of interest among the two or more candidate regions of interest in the first image, the target region of interest being determined automatically based on a comparison among two or more prompt alignment indicators for the two or more candidate regions of interest;

cropping the first image at the target region of interest to obtain a second image, the second image having a second aspect ratio that is different from the first aspect ratio; and causing presentation of the second image on the user device.

19. A non-transitory computer-readable storage medium, the computer-readable storage medium including instructions that when executed by at least one computer, cause the at least one computer to perform operations comprising:

receiving, from a user device, an image generation request comprising a prompt;

responsive to receiving the image generation request, generating, by a processor-implemented automated image generator and based on the prompt, a first image having a first aspect ratio;

determining two or more candidate regions of interest in the first image;

encoding, by a text encoder, the prompt to obtain an embedding of the prompt;

encoding, by an image encoder, each of the two or more candidate regions of interest to obtain an embedding of the candidate region of interest;

comparing the embedding of each of the two or more candidate regions of interest with the embedding of the prompt to obtain a prompt alignment indicator for each of the two or more candidate regions of interest in the first image, the prompt alignment indicator indicating a level of alignment between each candidate region of interest and the prompt;

determining a target region of interest among the two or more candidate regions of interest in the first image, the target region of interest being determined automatically based on a comparison among two or more prompt alignment indicators for the two or more candidate regions of interest;

cropping the first image at the target region of interest to obtain a second image, the second image having a second aspect ratio that is different from the first aspect ratio; and causing presentation of the second image on the user device.

* * * * *